(12) United States Patent
Konno et al.

(10) Patent No.: US 7,936,983 B2
(45) Date of Patent: May 3, 2011

(54) IMAGING DEVICE AND APPARATUS INSTALLED WITH THE SAME

(75) Inventors: Yasutaka Konno, Saitama (JP); Hironori Ueki, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 253 days.

(21) Appl. No.: 12/213,760

(22) Filed: Jun. 24, 2008

(65) Prior Publication Data

US 2008/0317303 A1    Dec. 25, 2008

(30) Foreign Application Priority Data

Jun. 25, 2007   (JP) ................. 2007-165766

(51) Int. Cl.
*G03B 41/00*    (2006.01)

(52) U.S. Cl. .............................. 396/14; 382/124

(58) Field of Classification Search .............. 396/14; 283/68; 356/71; 348/77; 382/124

See application file for complete search history.

(56) References Cited

U.S. PATENT DOCUMENTS

| 5,291,018 | A  | * | 3/1994 | Charpentier ............... 250/332 |
| 7,557,338 | B2 | * | 7/2009 | Gruhlke et al. ............ 250/221 |
| 2004/0184027 | A1 | * | 9/2004 | Mizutani et al. ........... 356/71 |
| 2005/0213797 | A1 | * | 9/2005 | Umeda ..................... 382/124 |

FOREIGN PATENT DOCUMENTS

| JP | 5-14620 A | 7/1991 |
| JP | 2003-030632 A | 7/2001 |
| JP | 2005-242841 A | 2/2004 |
| JP | 2005-276030 A | 3/2004 |
| JP | 2005-323892 A | 5/2004 |
| JP | 2006-086333 A | 9/2004 |
| JP | 2006-288872 A | 4/2005 |

* cited by examiner

*Primary Examiner* — Rodney E Fuller
*Assistant Examiner* — Linda B Smith
(74) *Attorney, Agent, or Firm* — Stites & Harbison PLLC; Juan Carlos A. Marquez, Esq.

(57) ABSTRACT

An imaging device includes a light source layer having imaging light source units for radiating the imaging light containing a first wavelength on an object to be imaged, a detection layer having detection elements for detecting the light of the first wavelength radiated from the light source units, and a light-blocking unit interposed between the light source layer and the detection layer. The light source layer is held between the detection layer and the object to be imaged. The light-blocking unit is arranged in such a manner as to block the direct radiation of at least part of the light radiated from the light source units to the detection elements.

17 Claims, 22 Drawing Sheets

FIG. 5A STEP 1 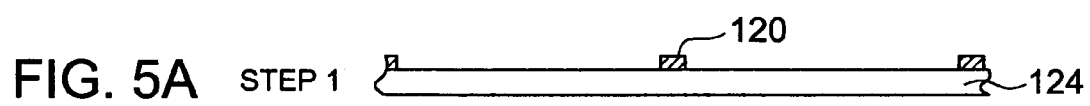
FIG. 5B STEP 2 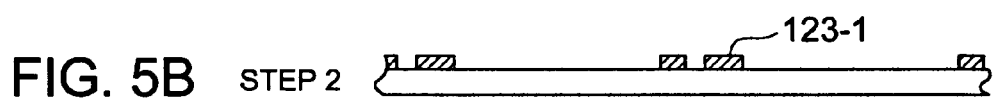
FIG. 5C STEP 3 
FIG. 5D STEP 4 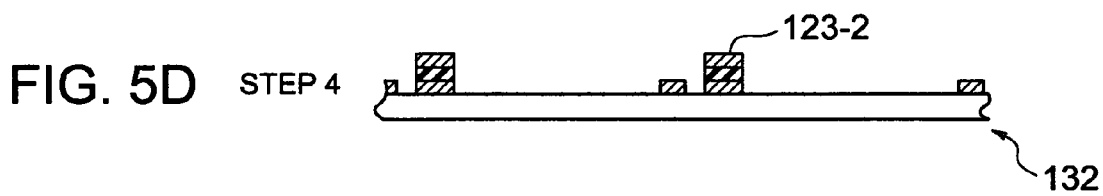

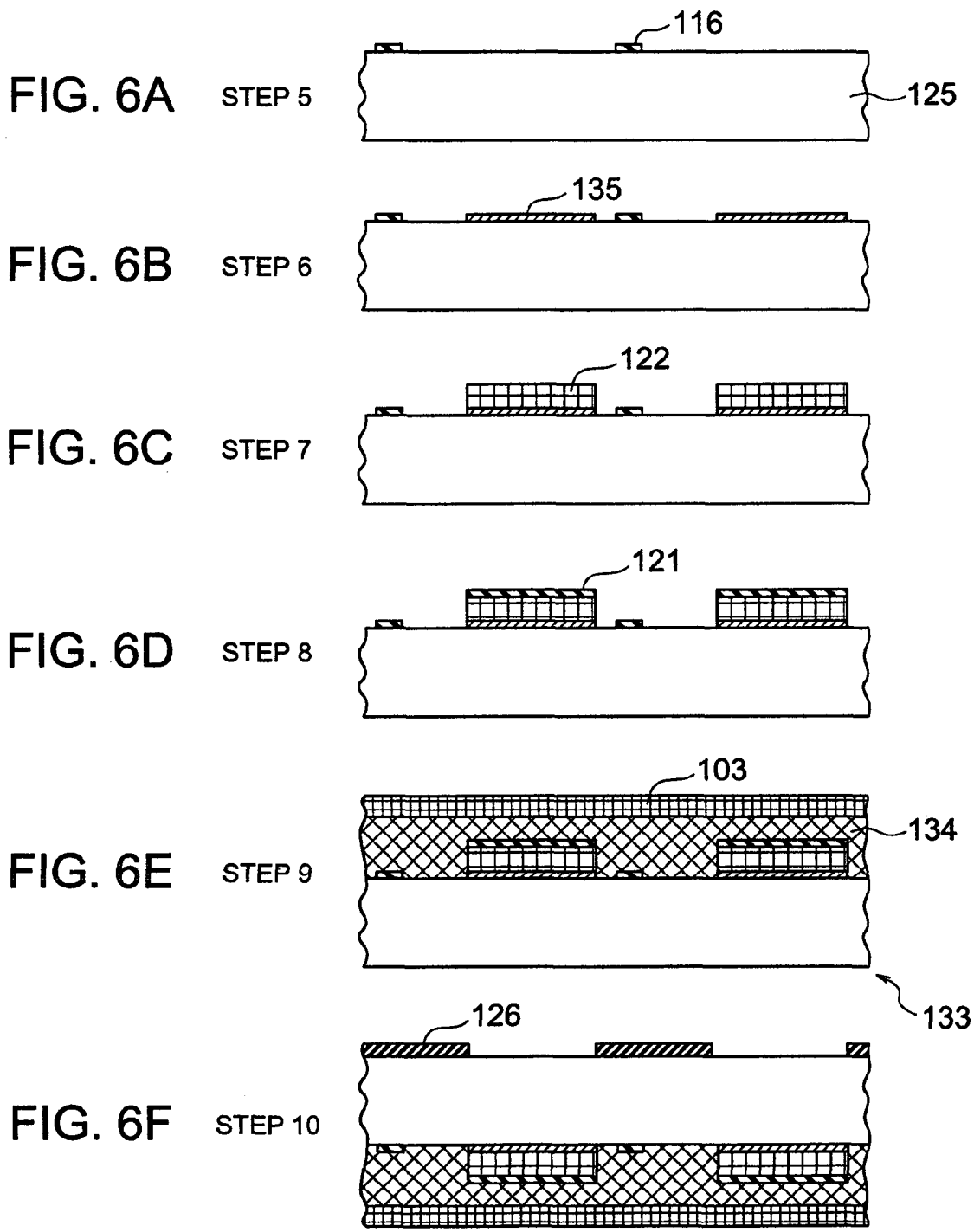

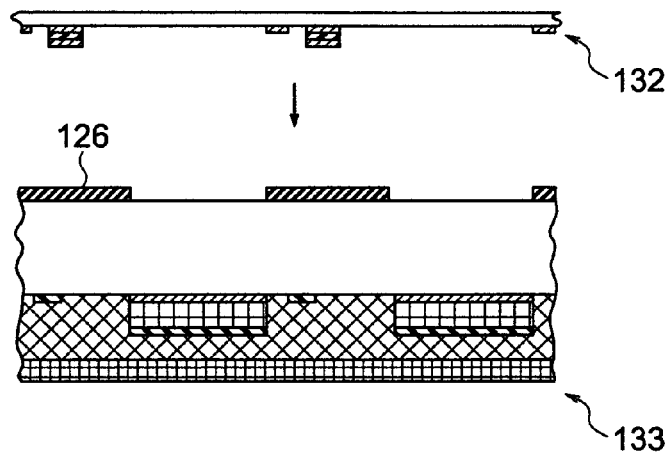
FIG. 7A STEP 11
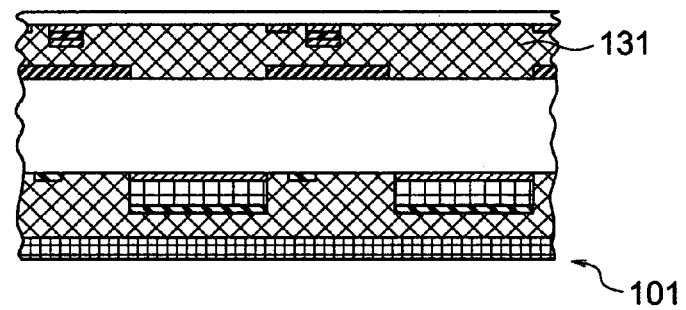
FIG. 7B

IMAGING DEVICE AND APPARATUS INSTALLED WITH THE SAME

INCORPORATION BY REFERENCE

The present application claims priority from Japanese application JP2007-165766 filed on Jun. 25, 2007, the content of which is hereby incorporated by reference into this application.

BACKGROUND OF THE INVENTION

This invention relates to an imaging device for an authentication apparatus using the finger veins, the palm veins, the veins of the back of the hand or the fingerprint, and an imaging device for the portable terminal such as the mobile phone, the PDA or the PC or the image reader such as the facsimile or the scanner.

A finger authentication apparatus is described below as a typical case.

The password has been widely used in an authentication method for identifying an individual person. Now that a more accurate authentication technique is in demand, however, the biological authentication technique is closely watched. This authentication method, which uses the features of a part of a living creature or the motion thereof (biological information), is high in security and utility and free of oblivion or loss as compared with the key or the password. The research is underway for the authentication method using the biological information including the fingerprint, the iris, the facial contour, the palm contour, the veins of the back of the hand, the palm veins, the finger veins, the voiceprint, the signature (handwriting) or the smell. Especially, the method using the finger veins has drawn special attention in recent years.

The authentication apparatus using the finger veins, as described in JP-A-2003-30632, employs the image of the finger veins picked up using the near infrared ray. According to JP-A-2003-30632, a finger is held between a near infrared light source and an imaging unit, and the light that has passed through the finger is converted to an image by the imaging unit. The blood vessel pattern image thus obtained is collated with the blood vessel pattern image registered in advance thereby to authenticate an individual person. In another apparatus configuration according to the method disclosed in JP-A-2005-323892 and JP-A-2006-288872, a light source and an imaging unit are arranged on the same side of a finger, and a blood vessel pattern image is obtained from the light scattered in the finger. In this configuration, an open space is available in the upper part of the imaging unit thereby to alleviate the sense of oppression on the part of the user while at the same time reducing both the size and thickness of the authentication apparatus.

This finger vein authentication is currently used for the bank ATM or the entry/exit management device, and another promising application is portable terminals such as a mobile phone. To realize this application, however, the imaging device including the light source is required to be reduced in thickness on the one hand and equipped with the display function at the same time.

As a method for realizing this application, a structure is available in which a detection element array is arranged on a light source. JP-A-2005-242841 and JP-A-2005-276030 disclose an imaging device integrated with a light source in which a detection element array is arranged on the display and held between an object to be imaged and the display. The use of the detection element array transmitting the display light makes it possible to produce an image by radiating the display light on the object at the time of picking up an image. JP-A-2006-86333, on the other hand, discloses an imaging device integrated with a light source having a structure in which a detection element array is similarly arranged on a display and held between an object and the display and in which the elements of the detection element array and the display elements are arranged in staggered fashion so that light can be passed between the elements of the detection element array.

Still another structure of an imaging device integrated with a light source having a light-emitting unit layer arranged on a detection element substrate is described in JP-A-5-14620. In this structure, a space where light can be transmitted is formed between the light-emitting units of the light-emitting unit layer in opposed relation to the detection elements. The light emitted from the light-emitting units is reflected from an object and detected by the detection elements through the space between the light-emitting units. The light-emitting units each have a structure in which a light-emitting element is held between a transparent electrode and a metal electrode with the transparent electrode arranged on the object side and the metal electrode on the detection element side. This metal electrode is covered by the bottom surface and the side surface of the detection element, thereby realizing a structure in which the direct light from the light-emitting units fails to reach the detection elements.

In the structure described in JP-A-2005-242841 and JP-A-2005-276030, however, the detection element array is required to transmit the light, and therefore, cannot be increased in detection sensitivity, thereby posing the problem that the light reflected from the object cannot be fully detected. Also, the fact that the display and imaging light are attenuated poses the problem that the display image quality is deteriorated and the power is consumed for radiation of the light not used. Also, the radiated light is transmitted through the detection element array, and therefore, a pseudo signal is likely to be generated by partial detection of the radiated light. Further, the display and the imaging operation cannot be performed at the same time.

The structure described in JP-A-2006-86333, on the other hand, encounters the problem that the fill factor of the detection element array cannot be increased and the light reflected from the object cannot be sufficiently detected. Also, since the display and imaging light is output through the detection elements, the problems are posed that the image displayed is dark, the display position resolution is deteriorated or otherwise the image quality is adversely affected, and the power is consumed for radiation of the unrequired light. Further, the realization of a structure transmitting the light only through the detection elements increases the cost of the detection element array and requires a high fabrication technique while at the same time reducing the yield.

The structure of JP-A-5-14620 poses the problem that the need of a metal electrode larger than the light-emitting element increases the size of the light-emitting unit, and therefore, the light-emitting units cannot be arranged densely. Also, in the case where organic EL elements each having a thickness of several 10 nm to several 100 nm are used as light-emitting elements, the electrodes undesirably come into contact with each other at the ends or corners thereof and the normal function of the light-emitting units may not be exhibited, resulting in a lower yield. To overcome this problem, a high production control technique and a high fabrication technique are required, thereby leading to a high apparatus cost. Another problem of the organic EL elements is that a multilayer structure having a current and hole transport layer and a buffer layer may be required between the light-emitting layer and the electrode, and cannot be realized by the structure described in JP-A-5-14620, or if realized, an unsatisfactory end layer structure would deteriorate the characteristics including the dark current.

SUMMARY OF THE INVENTION

Accordingly, it is an object of this invention to provide a novel imaging device integrated with a light source and an apparatus installed with the device free of the problems of the conventional devices described above.

In order to achieve the object described above, this invention is configured as described in the scope of the appended claims. Specifically, according to one aspect of the invention, there is provided an imaging device comprising a light source layer having a plurality of imaging light source units for radiating the imaging light containing a first wavelength on an object to be imaged, a detection layer arranged in opposed relation to the light source layer and having a plurality of detection elements for detecting the light of the first wavelength, and light-blocking means interposed between the imaging light source units and the detection elements, wherein the light source layer is held between the detection layer and the object to be imaged, and wherein the light-blocking means is arranged in such a manner as to interrupt the direct radiation of at least part of the light radiated from the light source units on the detection elements thereby to realize an imaging device integrated with a light source. Further, the light-blocking means prevents the direct light from entering the detection elements from the imaging light source units and suppresses the generation of a pseudo signal. Furthermore, since the light is not required to be transmitted, the detection sensitivity of the detection layer is improved and a large fill factor can be secured while at the same time making it possible to detect the signal with a high efficiency. In addition, the fact that the electrode of each light-emitting unit is not required to be larger than the light-emitting element makes it possible to arrange the light-emitting units densely. Furthermore, the layer structure of the light-emitting units can be realized by the ordinary lamination technique and the production control technique both easily and inexpensively using thin light-emitting elements such as the organic EL elements. In the process, the electrodes are not easily brought into contact with each other at the ends or corners thereof or not easily deteriorated in characteristics, thereby achieving a high yield.

According to another aspect of the invention, there is provided an imaging device comprising:

a means for controlling the accumulation time of the detection element signal and reading the pixel accumulation signal; and a means for controlling the light radiation of the imaging light source units;

wherein the detection layer includes a means for accumulating the electric signals of the detection elements and a means for switching the output of the accumulation signal, wherein the imaging light source control means performs the control operation in such a manner that at least one of the imaging light source units located at less than a predetermined distance from the first detection element constituting one of the detection elements emits no light while at least one of the imaging light source units located at no less than the predetermined distance from the first detection element emits light during the accumulation time of the first detection element. This structure and control operation makes it possible to prevent the direct light from entering the detection elements from the imaging light source units using a simple and inexpensive light-blocking means, thereby producing a similar effect to the one described above in the first aspect.

According to still another aspect of the invention, there is provided an imaging device having the first wavelength in the range of 600 nm to 1200 nm inclusive and applicable to an authentication apparatus using the finger veins, the palm veins, the veins of the back of the hand and the fingerprint.

According to yet another aspect of the invention, there is provided an imaging device wherein the imaging light source units each includes an organic EL light-emitting layer. This structure can realize a thin light source layer.

According to a further aspect of the invention, there is provided an imaging device wherein the light source layer includes a plurality of display light source units for emitting visible light, and the display light source units each have a structure in opposed relation to the detection element. This structure can realize a thin imaging device in which the display units, the light sources and the imaging units are integrated with each other. Further, the information such as a guide can be supplied by display, thereby realizing an imaging device that can be used conveniently by the user.

According to a still further aspect of the invention, there is provided an imaging device wherein the display light source unit is configured of two or more light source units having different, spectra. This configuration makes possible color display.

According to a yet further aspect of the invention, there is provided an imaging device wherein at least one of the imaging light source unit and the display light source unit includes an organic EL layer, and wherein the imaging light source units include at least one of a color conversion layer and a color filter. This structure can realize a transparent, thin light source layer.

According to another aspect of the invention, there is provided an imaging device further comprising an optical filter transparent to the imaging light and opaque to at least part of the visible light, interposed between the display light source units and the detection elements. This structure can prevent the detection of the frequency components not required for imaging in the case where the imaging light radiated from the imaging units is formed of a wide range of frequency components. Therefore, noises are reduced while at the same time improving the image contrast and the authentication accuracy.

According to still another aspect of the invention, there is provided an imaging device wherein the optical filter includes a reflection filter for reflecting at least part of the visible light. This structure can use the display light output toward the detection layer for display, and thereby improves the display light intensity and the display image quality. Further, the display of the same light intensity can be realized with a small amount of power for a reduced power consumption.

According to yet another aspect of the invention, there is provided an imaging device comprising:

a means for controlling the light radiation of the imaging light source units and the display light source units; and a means for controlling the accumulation time of the detection element signal and reading the pixel accumulation signal;

wherein the detection layer includes, for each of the detection elements, a means for accumulating the electric signals of the detection elements and a means for switching the output of the accumulation signal, wherein the light source control means causes the imaging light source units and the display light source units to radiate light during the accumulation time. This structure and the control operation makes it possible to display and pick up an image at the same time. Further, since the imaging circuit and the display circuit are not required to be operated in synchronism with each other, the control operation at a different rate is made possible and the imaging and radiation conditions are widened. Furthermore, the need of the synchronizing circuit is eliminated and the circuit size reduced.

According to a further aspect of the invention, there is provided an imaging device further comprising a shared light source unit doubling as at least a part of the display light source unit and at least a part of the imaging light source unit. This configuration eliminates the need of the imaging light source units and the control circuit thereof and can reduce the circuit size. Also, the steps of the process for fabricating the light-emitting units can be reduced for a shorter fabrication time at a lower cost. Further, the display units can be arranged densely to each other for an improved display quality.

According to a still further aspect of the invention, there is provided an imaging device wherein the shared light source unit has different light-emitting spectra for imaging and display operations, the imaging device further comprising a shared light source control means for controlling the power supplied to the shared light source unit. The light source control means is adapted to apply different voltages to the shared light source unit for the display and imaging operations thereby to change the light-emitting spectrum. This structure can radiate the light of a wavelength suitable for each of the display and imaging operations using the same light source unit.

According to a yet further aspect of the invention, there is provided an imaging device, wherein the detection elements are sensitive to at least to part of the visible light, thereby permitting the detection elements to detect the display light. Therefore, the detection element can be used as a calibration sensor for measuring the direct light from the display light source units and adjusting the display intensity or as a monitoring sensor for finding a malfunction of the display light source units. Also, the external light can be measured, thereby making it possible to use an external sensor for changing the display intensity in accordance with the external light.

According to another aspect of the invention, there is provided an authentication apparatus comprising:

a light source-carrying imaging device including light source units and detection elements for detecting the light radiated from the light source units and reflected on the surface of the object and/or the light scattered in the object;

a digital conversion means for generating a digital image of the biological information on a living creature constituting the object based on the signal supplied from the light source-carrying imaging device;

a storage means for storing the biological information on the object; and an authentication means for extracting the information by processing the signal of the digital image generated by the digital conversion means and comparing the information with the biological information stored in the extracted information storage means thereby to authenticate an individual person, wherein the light source-carrying imaging device is at least one of the imaging devices described above.

Also, the biological information is at least one of the fingerprint, the finger veins, the palm veins and veins of the back of the hand. This structure can realize various biological authentication apparatuses carrying the imaging device according to this invention.

According to still another aspect of the invention, there is provided a portable terminal comprising:

a light source-carrying imaging device including a light source layer having a plurality of display light source units for emitting the visible light and a plurality of imaging light source units for radiating the imaging light containing a first wavelength on an object to be imaged, a detection layer including a plurality of detection elements for detecting the light of the first wavelength radiated from the light source units, and a light-blocking means interposed between the light source layer and the detection layer, wherein the light source layer is held between the detection layer and the object to be imaged;

a digital conversion means for generating a digital image of the biological information on the object to be imaged;

a storage means for storing the biological information on the object in advance; and an authentication means for extracting the information by processing the signal of the digital image generated by the digital conversion means and comparing the extracted information with the biological information stored in the storage means thereby to authenticate an individual person;

wherein the light-blocking means is arranged in such a manner as to interrupt the direct radiation of at least part of the light radiated from the light source units on the detection elements.

According to the invention, there is provided a thin imaging device integrated with an imaging light sensor, a thin imaging device with a display function, and an authentication apparatus or an image reader carrying any of these imaging devices.

Other objects, features and advantages of the invention will become apparent from the following description of the embodiments of the invention taken in conjunction with the accompanying drawings.

BRIEF DESCRIPTION OF THE DRAWINGS

FIGS. 5A, 5B, 5C, 5D are first diagrams for explaining an example of the steps of fabricating the imaging device according to the first embodiment.

FIGS. 6A, 6B, 6C, 6D, 6E, 6F are second diagrams for explaining an example of the steps of fabricating the imaging device according to the first embodiment.

FIGS. 7A, 7B are third diagrams for explaining an example of the steps of fabricating the imaging device according to the first embodiment.

DETAILED DESCRIPTION OF THE INVENTION

First Embodiment

Figure 1:
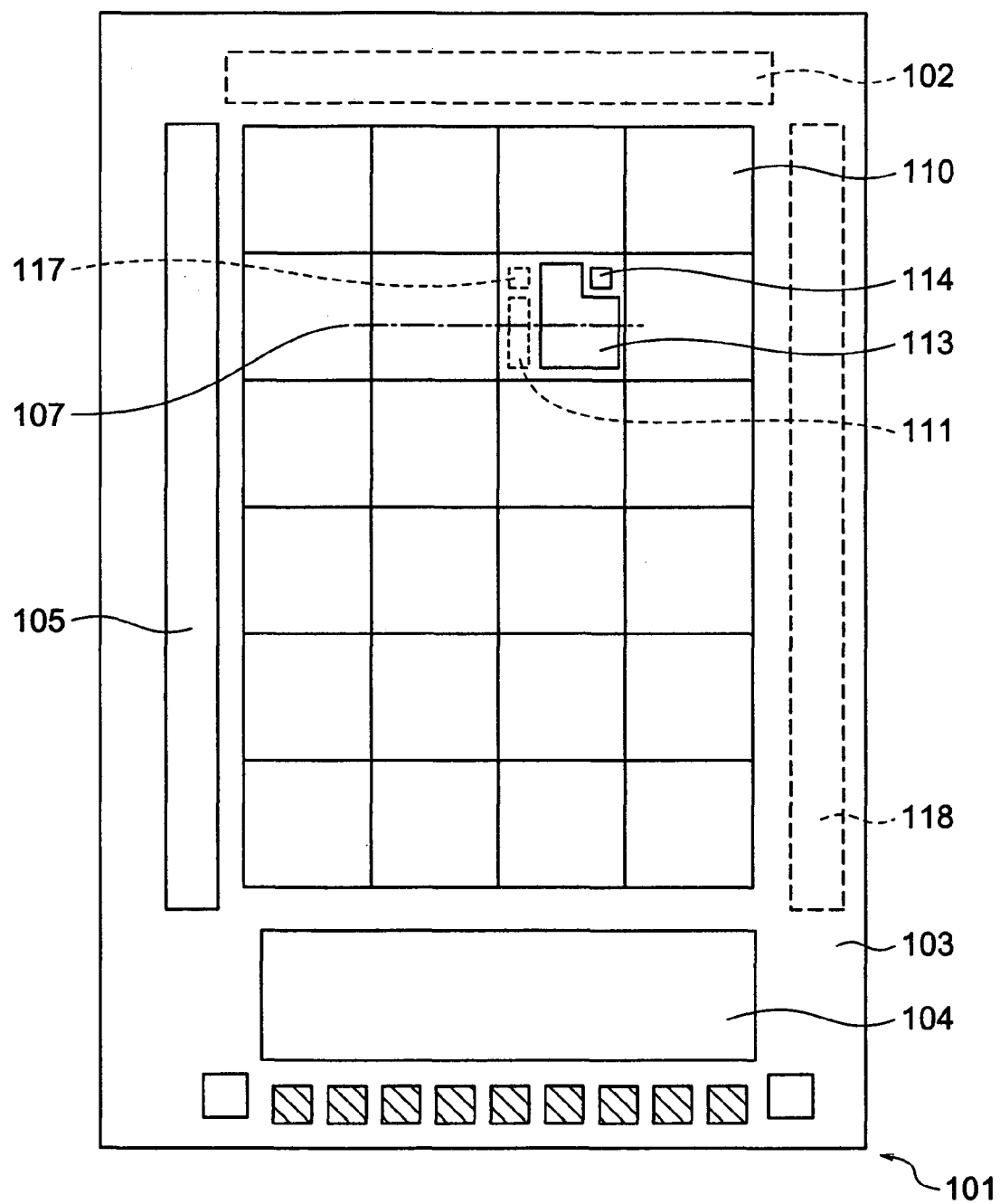
FIG. 1 is a diagram showing a general configuration of an example of an imaging device according to a first embodiment of the invention.

This embodiment represents an imaging device with an imaging light source as an application of the invention, and has a structure in which a light-emitting layer is arranged on a detection element layer. The first embodiment of the invention is explained below with reference to FIGS. 1 to 5. FIG. 1 is a view showing a general configuration of an example of the imaging device according to this embodiment, FIG. 2 a circuit diagram for explaining the circuit configuration of the imaging device 101, FIG. 3 a sectional view of the imaging device taken at position 107 in FIG. 1, FIG. 4 a diagram for explaining the conditions to block the incidence of the direct light from the light source units in FIG. 3, and FIGS. 5 to 7 diagrams for explaining the method of fabricating the imaging device 101.

With reference to FIG. 1, this embodiment is explained briefly. The imaging device 101 comprises a light source system (dotted line) for radiating the imaging light, and an optical sensor system (solid line) for acquiring an image by detecting the light. The optical system includes light-emitting units 111, light-emitting unit switches 117, a light-emitting unit current control circuit 102 and a light-emitting unit shift register 118. The optical sensor system, on the other hand, includes detection elements 113, detection element switches 114, a detection element shift register 105 and a reading circuit 104. The light-emitting unit 111, the detection element 113, the light-emitting unit switches 117 and the detection element switches 114 make up a pixel 110, and a plurality of the pixels are arranged two-dimensionally on a substrate 103. This configuration is an example of the embodiment and not intended to limit the scope of the invention. Further, the pixels 110 are shown in the number for facilitating the explanation, to which number this invention is not limited.

Figure 2:
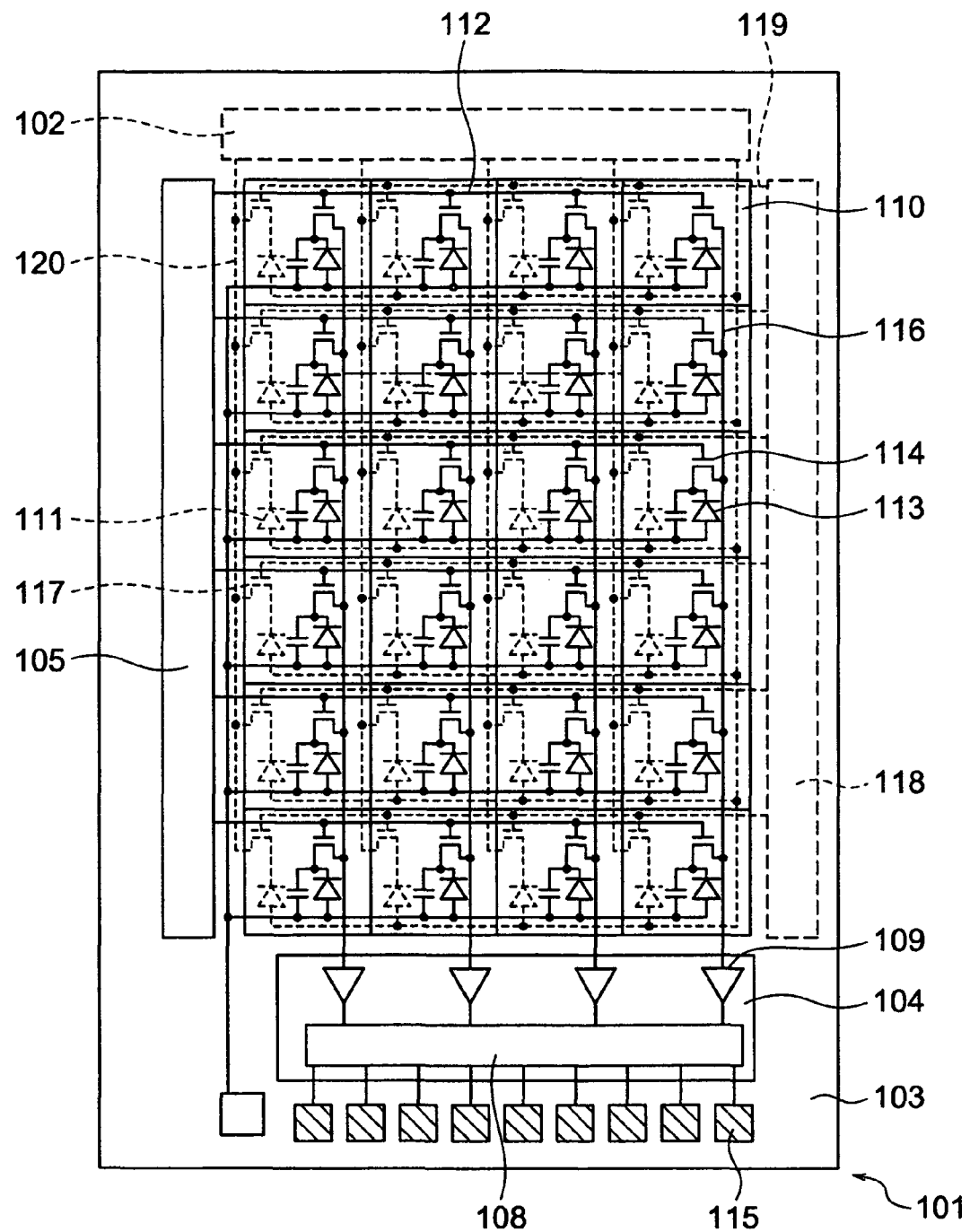
FIG. 2 is a circuit diagram for explaining the circuit configuration of the imaging device according to the first embodiment of the invention.

With reference to the circuit diagram of FIG. 2, an imaging method according to this embodiment is explained. In the imaging operation, light is radiated on an object to be imaged, and the light from the object is detected thereby to read the signal thus generated. This imaging method, however, is only an example of this embodiment and in no way intended to limit this invention.

First, light is radiated on one row only using the light source system. In the case under consideration, for example, only the first row is irradiated. For this purpose, the first step is to supply a voltage from the light-emitting unit shift register 118 to a light-emitting unit control line 119 thereby to turn on switches 117. In the process, the light-emitting unit control line 119 is connected to the gate electrodes of a plurality of the light-emitting unit switches 117 on the same row, which are thus turned on. Next, the light-emitting unit current control circuit 102 supplies a current to a light-emitting unit power line 120 arranged on each column. The light-emitting unit power lines 120 are connected to the drain electrodes of the light-emitting unit switches 117, and the source electrodes of the switches 117 are further connected to the light-emitting units 111. Therefore, a current is supplied to the light-emitting units 111 on the column selected by the light-emitting unit shift register 118. In this way, the light-emitting units 111 on the first row are turned on. Next, the switches 117 are turned off to stop emitting the light.

This light causes the detection elements 113 on the first row to generate the charge through the photoelectric conversion. Next, this charge signal is read row by row using the optical sensor system. In the optical sensor system, the detection elements 113 are connected to the drain electrodes of the detection element switches 114, the gate electrodes of the switches 114 to the detection element shift register 105 through detection element control lines 112, and the source electrodes of the switches 114 to the reading circuit 104 through the signal lines 116, respectively. Further, the switches 114 on the same row are connected to a common detection element control line 112, and therefore, by applying a voltage to the control line 112 on the first row, the charge generated in the detection elements 113 can be introduced to the reading circuit 104 at the same time for the respective columns. Next, the integrators 109 of the reading circuit 104 accumulate the charge and convert it into a voltage signal. Then, the analog-to-digital conversion (AD conversion) is effected by sample holding for each column in the IC chip 108. The result of the AD conversion is sequentially output from the output electrode pads 115. The electrode pads 115 are shown in the number which facilitates the explanation and is in no way intended to limit the invention.

Next, the imaging operation is performed for the next row. In the imaging device 101, each light-emitting unit power line 120 is connected to the light-emitting unit switches 117 on the same column, and each signal line 116 to the detection element switches 117 on the same column. By switching the row to be selected by the shift registers 105, 118, therefore, the row for light emission and the row for signal reading can be changed. In this way, the imaging operation is performed sequentially on the second, third and subsequent rows, and upon completion of the imaging operation for all the pixels 110, the image of the object can be obtained.

Figure 3:
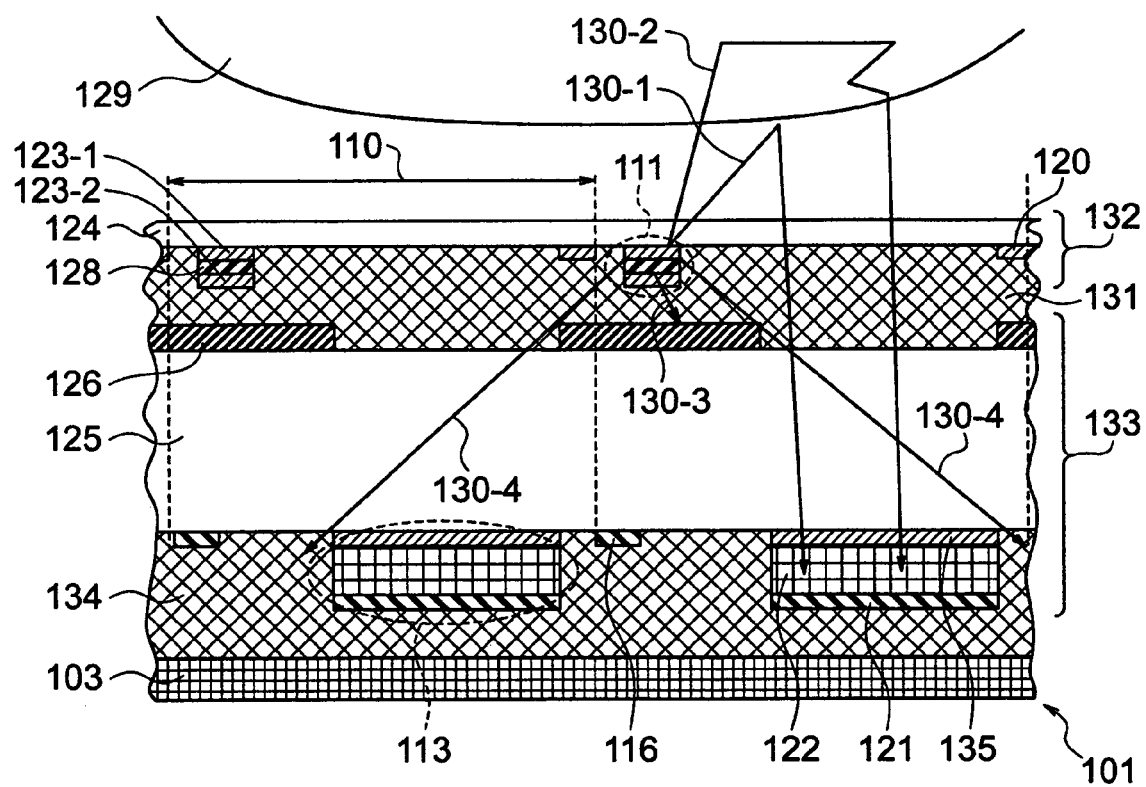
FIG. 3 is a sectional view showing the imaging device according to the first embodiment of the invention.

Next, with reference to FIG. 3, the structure of the imaging device 101 is explained. This structure is an example of this embodiment, and in no way limits the scope of the invention.

This imaging device 101 has such a structure that a light source unit layer 132 and a detection element layer 133 are bonded to each other by a transparent package adhesive 131, and the resulting assembly is coupled to a substrate 103 with a package adhesive 134. In the light source unit layer 132, the light source units 111 for the respective pixels 110 are formed on the lower surface of a transparent glass substrate 124. Each light source unit 111 has a structure in which a light-emitting element 128 is held between two transparent electrodes 123-1, 123-2. This embodiment represents the light-emitting element 128 formed of an organic EL material, and shows only one example of the embodiment to which the invention is not limited. The light-emitting element 128 may alternatively be formed of, for example, the inorganic EL material. Further, the light-emitting element 128 may be realized by the plasma light-emitting element, the field emission display element, the light-emitting diode or the liquid crystal combined with a backlight. In still other possible examples of the method for realizing the light-emitting element 128, the light is emitted by being led like in the backlight for the liquid crystal display or the light is led with an optical fiber. In the detection element layer 133, on the other hand, a detection element 113 is formed for each pixel 110 on the lower surface of a transparent glass substrate 125. Each detection element 113 has a structure in which an amorphous silicon layer 122 is held between a transparent electrode 135 and an aluminum electrode 121. Light-blocking layers 126 for masking the light radiated from the light-emitting elements 128 are arranged on the upper surface of the glass substrate 125.

In this structure, part of the light radiated in the direction toward an object 129 to be imaged is reflected on the surface of the object 129 like the light 130-1 or scattered in the object 129 like the light 130-2 and returned to the imaging device 101, so that part thereof reaches and is detected by the detection element 113. The light 130-3 emitted toward the detection element 113, on the other hand, is blocked by the light-blocking layer 126 and fails to reach the detection element 113. The light 130-4 output toward the detection element layer 133 without being blocked by the light-blocking layer 126 fails to enter the detection element 113 arranged at a position hidden from the light source unit 111 in the shadow of the light-blocking layer 126. As a result, a structure can be realized in which the detection element 113 can detect the light from the object 129 without detecting the direct light from the light source unit 111, thereby making it possible to form an image of the object 129 to be imaged.

Figure 4:
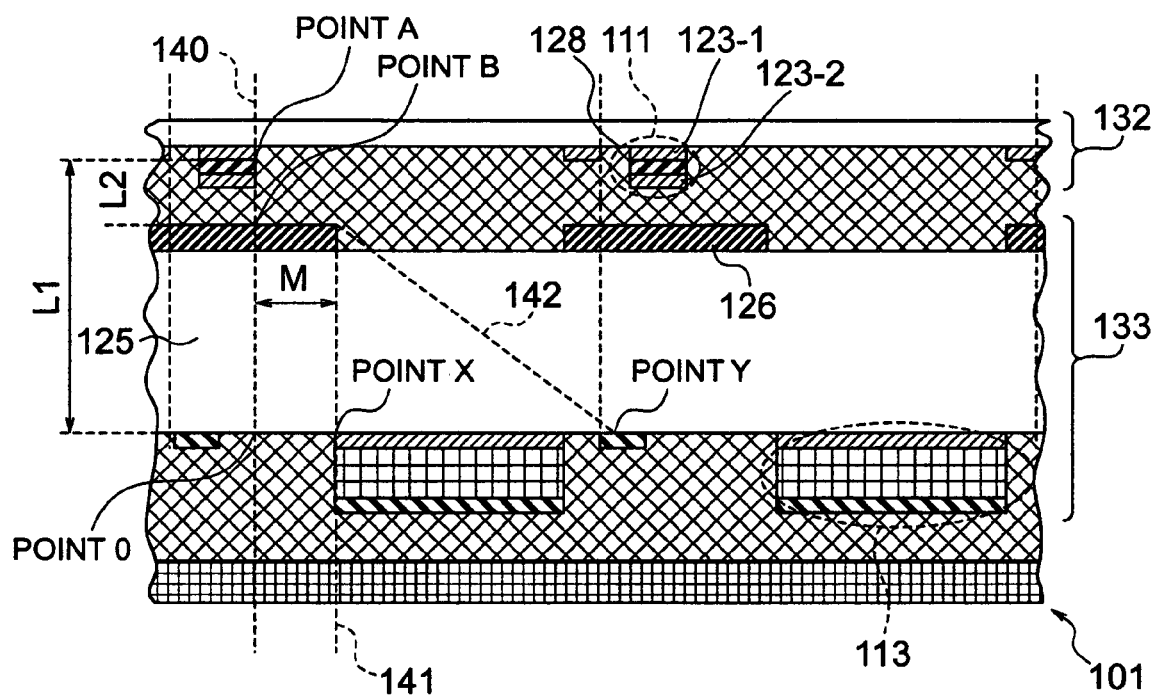
FIG. 4 is a diagram for explaining the conditions for interrupting the direct light input.

The conditions under which each detection element 113 can be arranged at a position hidden from the light source unit 111 in the shadow of the light-blocking layer 126 are explained with reference to FIG. 4. Point A is an end of the light source unit 111 and constitutes a contact point between the upper transparent layer 123-1 and the light-emitting element 128. A straight line 140 is the normal to the detection element layer 133 passing through point A. A straight line 141, on the other hand, is the normal to the detection element layer 133 passing through the end of the light-blocking layer 126. A straight line 142 passes through the end of the upper surface of the light-blocking layer 126 and point A. Point B is an intersection between the upper surface of the light-blocking layer 126 and the normal 140. Point 0 is an intersection between the lower surface of the glass substrate 125 and the normal 140. Point X is an intersection between the lower surface of the glass substrate 125 and the normal 141. Point Y is an intersection between the lower surface of the glass substrate 125 and the straight line 142. Further, the length from the end of the light-blocking layer 126 to point B is designated as M, the length of the line segment A0 as L1, and the length of the line segment AB as L2.

In this structure, assume that the detection element 113 is arranged between points O and Y. Then, the direct light from each light source unit 111 is prevented from entering the detection element 113. In the case where the detection element 113 is arranged on the right side (in FIG. 4) of point X, on the other hand, the light entering at right angles to the detection element layer 133 from the object to be imaged can be detected, and therefore, the scattered light entering the detection element layer 133 diagonally can be reduced for an improved image quality including the contrast. Thus, each detection element 113 is desirably arranged between points X and Y. Further, with this structure, the length of the line segment OX is M, and the length of the line segment OY is (L1/L2)M. Therefore, the detection element 113 is desirably arranged in the range distant from point 0 by not less than M but not more than (L1/L2)M. Specifically, assuming, for example, that L1 is 40 μm, L2 5 μm and M 10 μm. The detection element 113 is required to be arranged at a position in or shorter than the range of 10 μm to 80 μm inclusive from point 0.

The foregoing study shows that a structure large in M and small in L1 is desirable. The structure with the light-blocking layer 126 larger than the transparent electrode 123-2 is large in M and desirable, while the structure with the light-blocking layer 126 arranged in proximity to the transparent electrode 123-2 is small in L1 and desirable.

Next, the method of fabricating the imaging device 101 is explained. First, the method of fabricating the light source unit layer 132 is explained with reference to FIGS. 5A, 5B, 5C, 5D. In step 1, a wiring and a switch for each light source unit 111 are formed on the glass substrate 124. Although only the power line 120 for the light-emitting unit is shown in FIG. 5A, the light-emitting unit control line 119 and the light-emitting unit switch 117 are also fabricated. The wiring is formed by the vacuum deposition process using, for example, aluminum. The light-emitting unit switch 117 is formed as a TFT switch, for example, using silicon.

In step 2, the transparent electrode 123-1 is formed on the glass substrate 124 after step 1. The transparent electrode 123-1 is formed of, for example, an oxide semiconductor film of ITO, indium oxide or tin oxide, a metal film of gold, silver, platinum or aluminum, a spinel compound, a conductive nitride film, a conductive boride film or a conducting polymer. The method of forming the transparent electrode 123-1 includes the physical deposition process such as the vacuum vapor deposition, sputtering or molecular beam epitaxy, the chemical deposition process such as thermal CVD or plasma CVD, the deposition process such as the sol-gel process, plating or coating, and the substrate penetration process such as oxidation, diffusion or ion implantation.

In step 3, the organic EL layer 128 is formed on the glass substrate 124 after step 2. The organic EL layer 128 is formed, roughly speaking, of a monomeric light-emitting material or a high-polymer light-emitting material. The monomeric light-emitting material includes, for example, polymetyne dye, polycyclic aromatic compound, hetero aromatic ring compound, polyphelene compound, other metal complexes or metal compounds. The high-polymer light-emitting material, on the other hand, includes the EL conducting polymer such as the silicon group including p-phynylene vinylene, polythiophene, polyfluorene or 2-substituted polyacetylene. Also, the use of the metal complex such as Ir, Eu or Pt or the high polymer containing any of the metal complexes as the light-emitting layer may produce an organic EL light-emitting material utilizing the phosphor light or having monomeric and high-polymer materials dispersed therein.

Examples of the method of forming the organic EL layer 128 include the vacuum deposition for the monomeric light-emitting materials, and the vacuum deposition, casting, spin coating, ink jet, screen printing or thermal transfer for the high-polymer light-emitting materials. Any of these processes may be used.

In step 4, the transparent electrode 123-2 is formed in similar manner to step 2 on the glass substrate 124 after step 3. In this way, each light source unit 132 is formed.

Next, the method of forming each detection element layer 133 is explained with reference to FIGS. 6A, 6B, 6C, 6D, 6E, 6F. In step 5, the wiring and the switch for the detection element 113 are formed on the glass substrate 125. Although only the signal line 116 is shown in FIG. 6A, the other parts including a detection element control line 112, a detection element switch 114 and an output electrode pad 115 are also formed. The wiring and the pad are formed by the vapor deposition process using, for example, aluminum. The detection element switch 114 is, for example, a TFT switch formed using polysilicon.

In step 6, each transparent electrode 135 is formed on the glass substrate 125 after step 5. A material and a method similar to those of step 2 may be used for this step 6. In step 7, amorphous silicon 122 containing hydrogen is formed on the glass substrate 125 after step 6. The process used for this purpose includes plasma CVD, reactive sputtering, thermal CVD or optical CVD.

In step 8, each aluminum electrode 121 is formed on the glass substrate 125 after step 7 using, for example, the vacuum deposition process. In step 9, the glass substrate 125 after step 8 is bonded to the substrate 103 using the package adhesive 134. In this way, the detection element layer 133 is produced.

In step 10, each light-blocking layer 126 is formed on the detection element layer 133 after step 9. The light-blocking layer 126 is formed on the other surface of the glass substrate 125 formed with the detection elements 113. FIG. 6F shows that the detection element layer 133 formed in step 9 is turned upside down and the light-blocking layer 126 is formed on the upper surface. This light-blocking layer 126 is formed by vapor-depositing, coating or printing, for example, a metal film or an opaque ink material.

Next, as shown in FIGS. 7A, 7B, the light source unit layer 132 thus formed and the detection element layer 133 formed with the light-blocking layers 126 are bonded to each other with the package adhesive 131. After that, the light-emitting unit current control circuit 102, the light-emitting unit shift register 118 and the detection element shift register 105 are installed and wired. Through this process, the imaging device 101 is realized. The materials and the fabrication method used in the fabrication process described above are only illustrative, and the invention is not limited to them. Also, the fabrication method shown in FIGS. 5A, 5B, 5C, 5D to 7A, 7B is also an example, to which the invention is not limited.

In this imaging device 101, the light-emitting units 111 can be arranged two-dimensionally, and therefore, the light quantity can be controlled with high accuracy. The image of the object 129 is obtained, for example, using the light from the light-emitting units 111 once, and then, after analyzing the image, the object is imaged again using the light from the light-emitting units 111. At the same time, the light-emitting units 111 are controlled in such a manner that the average output is not reduced below the threshold value in a given area in the image. As a result, the generation of a partial area where SN ratio is low in the image can be suppressed. In still another method, the power supplied to the light-emitting units 111 corresponding to the bright part of the image previously acquired is reduced, while the power supplied to the dark part is increased. In this way, the quantity of the power supplied to produce a uniform image is determined. From this power quantity for each light-emitting unit 111, the image of the object 129 may be formed.

According to this embodiment, the light is radiated and the signal is read row by row. This invention, however, is not limited to this configuration, and the signal may be read after complete light radiation of all the rows. In such a case, the signal to be read is the charge signal generated while the light is emitted from the light-emitting units 111 of all the rows. Also, the light, though radiated row by row according to this embodiment, may alternatively be radiated from selected plural rows or all the rows at a time. Further, the detection elements 113 for light radiation and those for the read operation are not necessarily identical with each other. By separating the light-emitting units 111 for light radiation and those for the read operation, the light reflected on the object 129 and reaching the detection elements 113 is sharply reduced, and the light scattered in the object 129 is mainly detected. This imaging method, therefore, is suitable for the vein authentication.

Although the light source system according to this embodiment is an active circuit system having a switch 117 for each light-emitting unit 111, a passive circuit system may of course be employed with equal effect. Also, a circuit configuration may be employed in which each light-emitting unit 111 is arranged in one-to-one relation with the light-emitting unit power line 120 to display a plurality of the light-emitting units 111 at the same time. In the light source reading system according to this embodiment, on the other hand, the signal is read sequentially for each row. Nevertheless, a configuration or a system can be employed in which the detection element 113 and the reading circuit are connected in one-to-one relation and part or the whole of detection elements 113 may be read at the same time.

In the light source unit layer 132 according to this embodiment, as described above, each light-emitting element 128 is formed of an organic EL material for emitting the light of a wavelength required for imaging. This is only an example of an embodiment and in no way intended to limit the invention. A structure of color conversion type with a color conversion layer, for example, may be employed wherein each light source unit 111 has a color conversion layer, each light-emitting element 128 emits the blue light and by changing the wavelength through the color conversion layer, the light is radiated on the object. Also, the light-source unit 111 may be a color filter structure, wherein the light source unit 111 has a color filter, the light-emitting element 128 emits the white light and only the light of the required wavelength is transmitted by the color filter and radiated on the object. Also, the light-source unit layer 132 may be formed of any of various materials other than the organic EL material.

Although the light-source unit layer 132 according to this embodiment has such a structure that the light-emitting element 128 of each light-source unit 111 is held between the two electrodes, this structure is only an example of an embodiment and the invention is in no way limited to such a structure. As an alternative, a structure may be employed in which one or both of a current transport layer and a hall transport layer is arranged between the electrodes and the light-emitting element 128.

In the light source system according to this embodiment, the detection layer of each detection element 113 of the detection element layer 133 is formed of amorphous silicon. In place of amorphous silicon, however, any of various other photoelectric conversion materials including crystal silicon, polysilicon, cadmium telluride, cadmium/zinc telluride and lead iodide may of course used.

In the imaging device 101 according to this embodiment, the light source unit 111 and the detection element 113 correspond in one-to-one relation to each other. This is only an example of the embodiment, and the invention is not limited to this configuration, various cases may be available alternatively. For example, the light source units 111 may be arranged either more coarsely or closely than the detection elements 113. Also, the density of the light source units 111 may be varied from one place to another.

According to this embodiment, the glass substrate 125 constituting a part of the detection element layer 133 is used as a transparent member interposed between the light-blocking layer 126 and the detection element layer 133. As an alternative, a part of the detection element layer 133 may be used as a transparent member or a transparent not constituting a part of the detection element layer 133 or the light-source unit layer 132 may be interposed between the light-blocking layer 130 and the detection element layer 133.

The imaging device 101 according to this embodiment desirably includes a collimator between the object 129 and the light-emitting unit layer 132 and/or between the light-emitting unit layer 132 and the detection element layer 133. As a result, the light is prevented from entering the detection element layer 133 as scattered light diagonally from the object 129 to be imaged. Thus, the pseudo signal can be reduced with both the image contrast and the authentication accuracy improved.

In the imaging device 101 according to this embodiment, each light-blocking layer 126 desirably faces the dead zone with the detection element 113. Also, desirably, the detection element control line 112, the signal line 116 and the detection element switch 114 are arranged under and in the shadow of the light-blocking layer 126. As a result, the fill factor of the detection element 113 is prevented from being reduced by the space where the reading circuit is arranged. Also, by arranging each detection element switch 114 in the shadow of the light-blocking layer 126, the pseudo signal which otherwise might be generated by the light entering the detection element switch 114 can be suppressed.

In the imaging device 101 according to this embodiment, the light-emitting unit switch 117 desirably includes a light-blocking means for preventing the entrance of light. This prevents the malfunction of the light-emitting unit switch 117 which otherwise might be caused by the incident light. Further, the light-blocking means is desirably arranged above the light-blocking layer 126. The part above the light-blocking layer 126 is a dead zone, and therefore, a new dead zone is not formed by the light-blocking means of the light-emitting unit switch 117.

Second Embodiment

Figure 8:
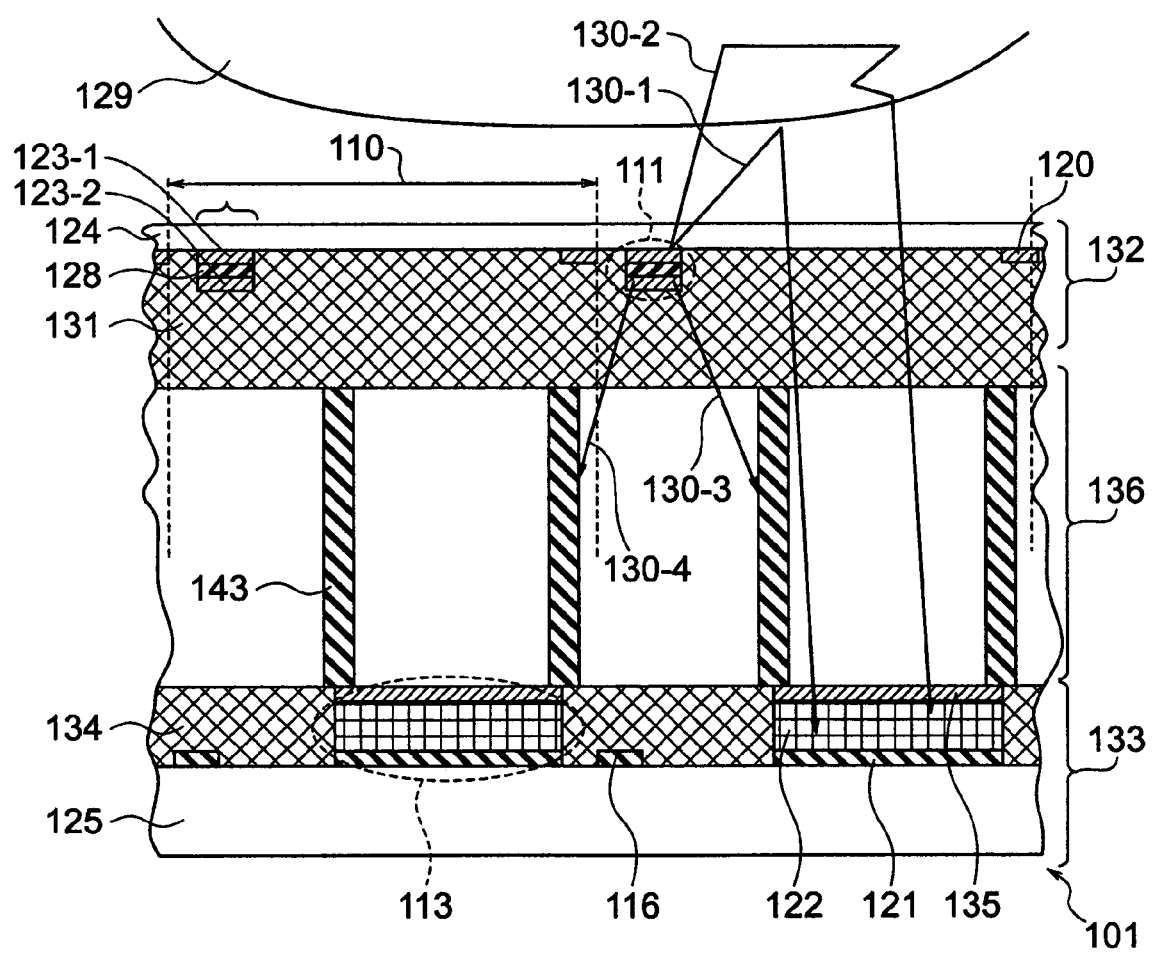
FIG. 8 is a sectional view showing the imaging device according to a second embodiment.
Figure 9:
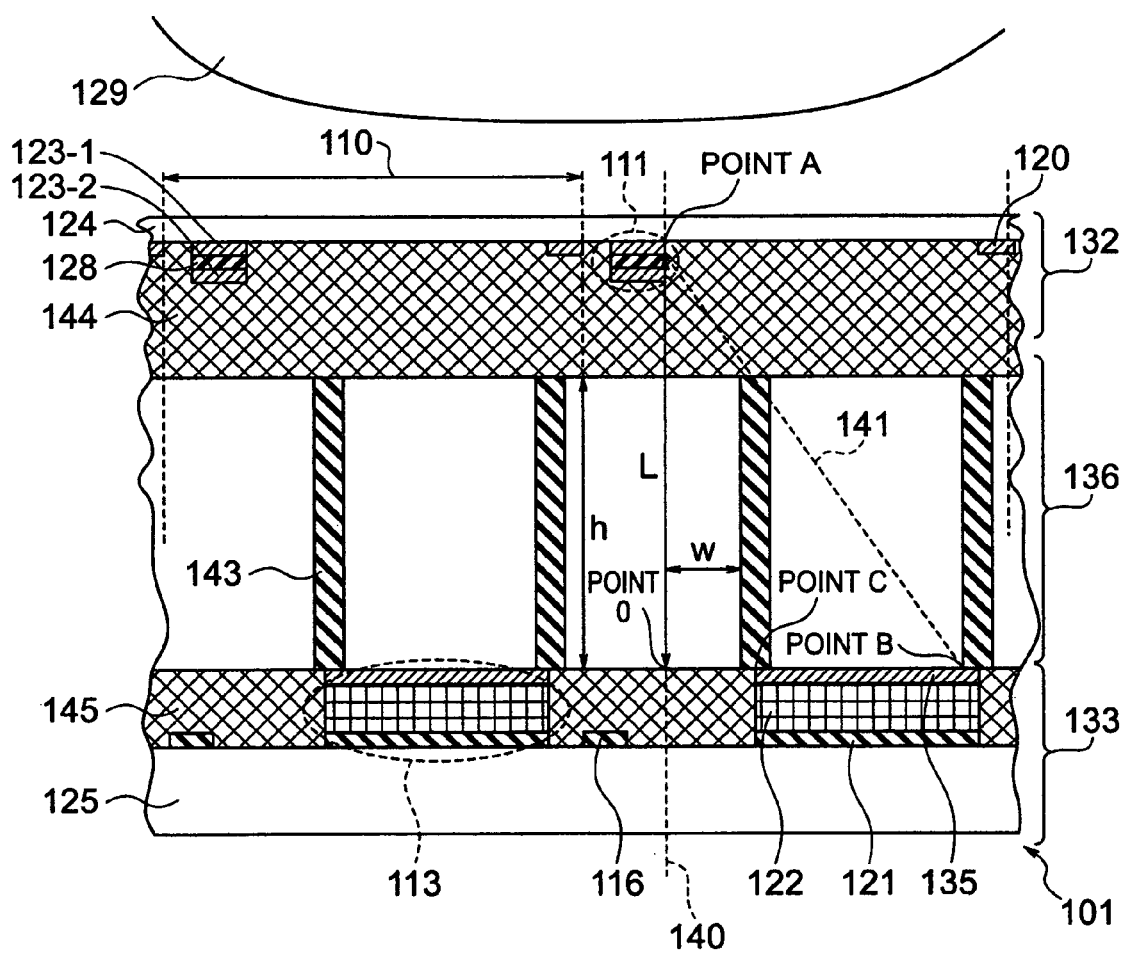
FIG. 9 is a diagram for explaining the conditions for blocking the direct light.

The imaging device 101 according to this embodiment is different from the first embodiment in that a collimator layer is used as a means for preventing the entrance of the direct light into each detection element 113 from the light source units 111. FIG. 8 is a sectional view for explaining the structure of an example of the imaging device according to this embodiment taken at position 107 in FIG. 1. FIG. 9 is a diagram for explaining the conditions for preventing the entrance of the direct light from the light source units 111 in FIG. 8.

In the imaging device 101 according to this embodiment, a collimator layer 136 is formed between the light source unit layer 132 with the light source units 111 formed on the glass substrate 124 and the detection element layer 133 with the detection elements 113 formed on the glass substrate 125, which are bonded to each other by transparent package adhesives 131, 134. The collimator layer 136 has a structure in which light-blocking plates 143 are juxtaposed with spatial intervals and interposed between the light source units 111 and the detection elements 113. With this structure, the light 130-3, for example, proceeding toward a detection element 113 directly from a light source unit 111 is interrupted by a light-blocking plate 143, while part of the light 130-1 reflected from the object 129 and the light 130-2 scattered in the object 129 reaches the detection element 113. As a result, the entrance of the direct light is prevented and an image of the object 129 can be produced.

Further, in the imaging device 101 according to this embodiment, the scattered light entering the detection element layer 133 diagonally from the object to be imaged can be removed by the collimator layer 136 thereby to improve the image quality.

The layout conditions of the detection elements 113 required for preventing the entrance of the direct light are explained with reference to FIG. 9. Point A is an end of a light source unit 111 and constitutes a contact point between the upper transparent layer 123-1 and the light-emitting element 128. A straight line 140 is the normal to the detection element layer 133 passed through point A, and the intersection of the straight line 140 with the surface of the detection element layer 133 is point 0. A straight line 141, on the other hand, starts from point A and, passing through the end (open side) of the light-blocking plate 143 adjacent to the straight line 140, forms an intersection with the surface of the detection element layer 133 at point B. The intersection (open side) between the light-blocking plate 143 nearest to the straight line 140 and the surface of the detection element layer 133 is designated as point C. Further, the length of the line segment AO is designated as L, the distance between the light-blocking plate 143 nearest to the light source unit 111 and the straight line 140 as w, the width of the light-blocking plate 143 as d, and the height thereof as h.

In this structure, assuming that each detection element 113 is arranged between points B and C, the direct light cannot enter from the light source unit 111. The length of the line segment OC is (w+d), the length of the line segment OB is (w+d)L/(L−h), and the detection element 113 is desirably arranged in the range distant from point 0 by not less than (w+d) but not more than (w+d)L/(L−h). Specifically, assuming that L is 90 µm, w 5 µm, h 60 µm and d 20 µm, for example, each detection element 113 is required to be arranged in or shorter than the range of 25 to 75 µm from point 0.

The foregoing study shows that h desirably has a value approximate to L. The structure with the collimator 136 located in the vicinity of the light-emitting layer 132 has the value h approximate to L and is desirable.

In the imaging device 101 according to this embodiment, the interval of the light-blocking plates 143 is desirably not more than one half of the width of the pixel 110. As a result, the structure can be realized in which the direct light from both the left and right light source units 111 can be shut off.

According to this embodiment, the collimator layer 136 has a structure as a collimator only in the direction indicated by position 107 in FIG. 1, but the invention is not limited to this configuration. As an alternative, a collimator layer is realizable in which a collimator structure is located in the direction perpendicular to the aforementioned direction or in both directions.

According to this embodiment, the collimator layer 136 is formed separately from the detection element layer 133 and the light source unit layer 132. The collimator layer 136, however, may alternatively be a part of the detection element layer 133 or the light source unit layer 132. The detection element layer 133, for example, may be so structured that the detection elements 113 are mounted on the line control film or the fiber optical plate having the collimator structure.

Third Embodiment

Figure 10:
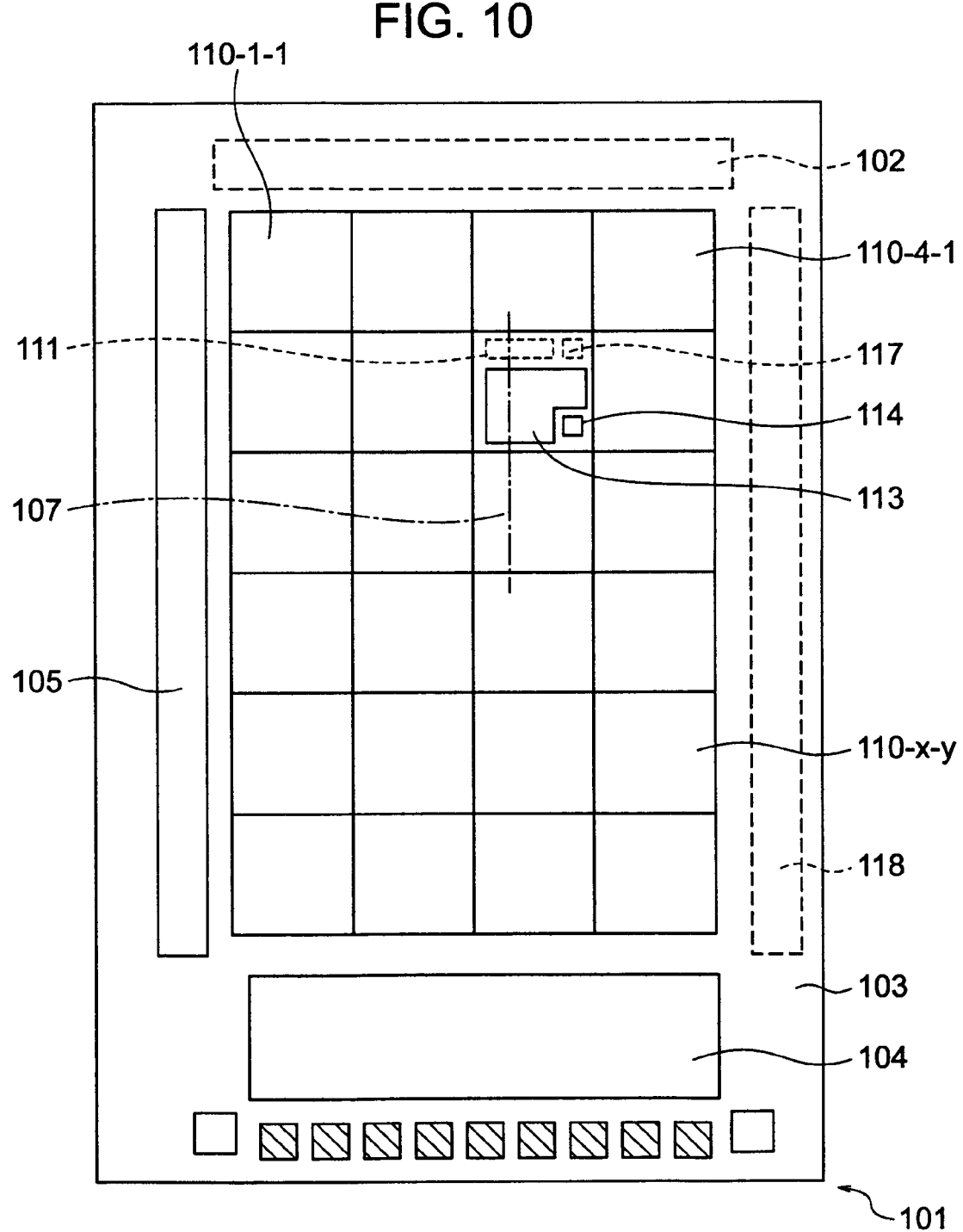
FIG. 10 is a diagram showing a general configuration of an example of the imaging device according to a third embodiment.
Figure 11:
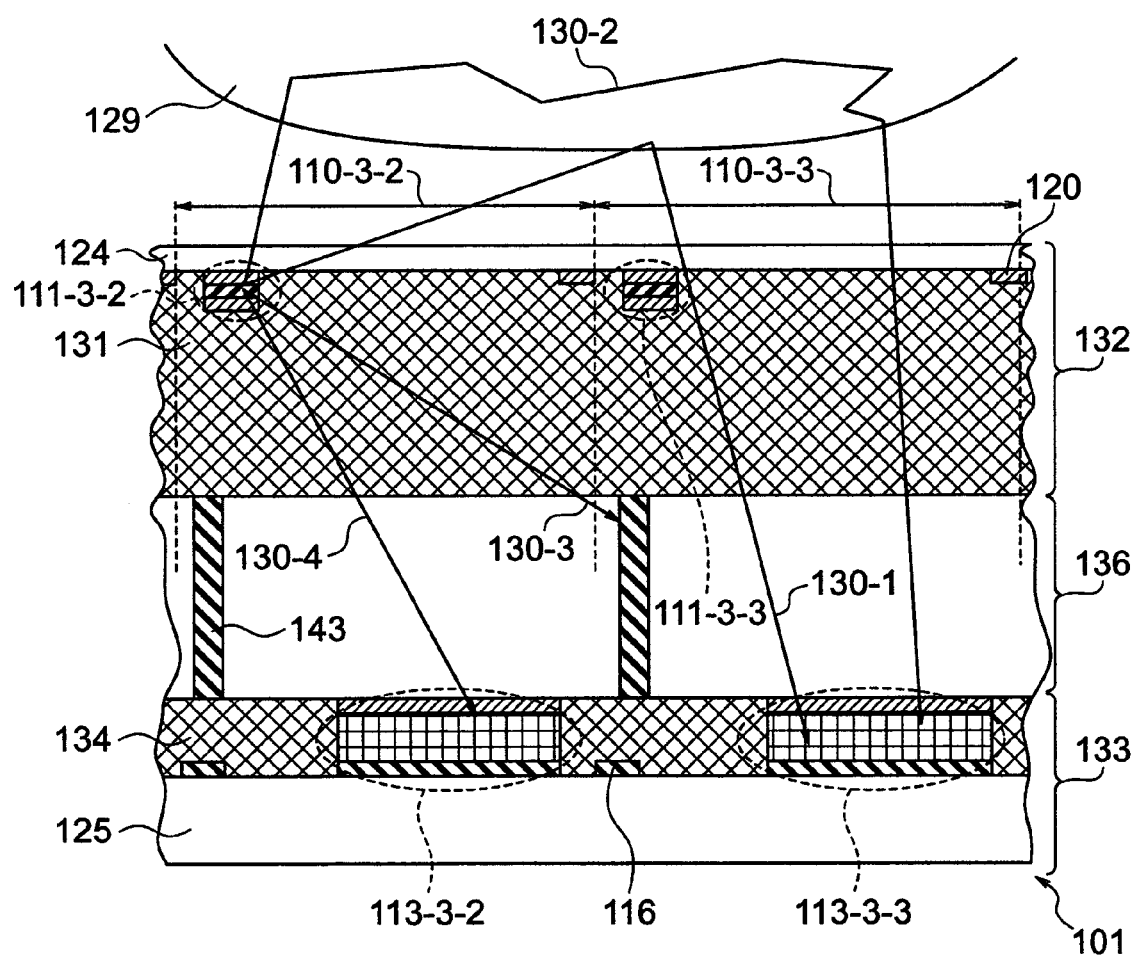
FIG. 11 is a sectional view of the imaging device according to the third embodiment.
Figure 12:
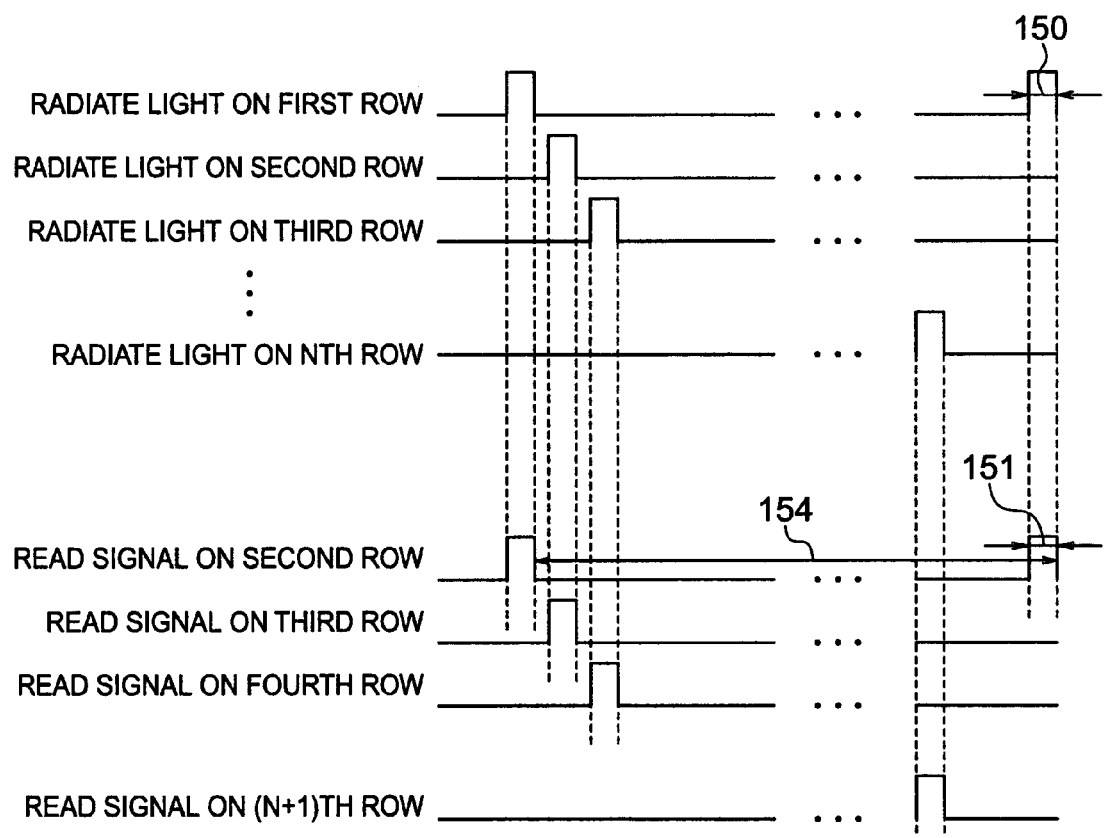
FIG. 12 is a diagram for explaining the timing of radiating the light and reading the signal of the imaging device according to the third embodiment.

The imaging device 101 according to this embodiment is different from the second embodiment in the signal reading method. FIG. 10 is a diagram showing a general configuration of an example of the imaging device according to this embodiment. FIG. 11 is a sectional view of the imaging device. FIG. 12 is a timing chart for explaining the timing at which the light is radiated and the signal is read.

In the imaging device 101 according to this embodiment, as shown in FIG. 10, the pixels 110 each having the light source unit 111 and the detection element 113 are arranged two-dimensionally. A given pixel arranged in column x and row y is referred to as the pixel 110-x-y. The light source unit 111 and the detection element 113 are also designated similarly.

The imaging device 101 according to this embodiment, like the structure of the second embodiment, uses the collimator layer 136. As shown in FIG. 11, however, only one light-blocking plate 143 is arranged for each pixel so that the light-blocking plates 143 are arranged more coarsely than in the second embodiment. As a result, the direct light enters the same pixel but no other pixels. FIG. 11 shows a case in which the light-emitting unit 111-3-2 of the pixel 110-3-2 emits light, and the direct light enters the detection element 113-3-2 associated with the same pixel but not the detection element 113-3-3.

The timing at which the light is radiated and the signal is read is explained with reference to FIG. 12. According to the timing of controlling the light radiation in FIG. 12, a light-emitting unit 111 to emit light is selected by the light-emitting unit shift register 118 when the signal is high, and power is supplied by the light-emitting unit current control circuit 102 to emit light. According to the timing of controlling the signal read operation, on the other hand, a detection element 113 to read the signal is determined by the detection element shift register 105 when the signal is high, so that the signal is read by the reading circuit 104. In this read operation, the charge generated before the time 151 is also accumulated as the parasitic capacitance and the external capacitance of the detection elements 113 and read in addition to the signal for the time 151. The signal output during the time 151, therefore, constitutes the charge generated during the time 154 and the charge due to the dark current generated during the particular time 154 is also output. According to this embodiment, however, the dark current is ignored as compared with the charge generated by the light. Should the dark current be not ignorable, the reset process is executed immediately before the read operation. The reset process can be realized by removing the charge accumulated in the detection elements 113 by reading the signal. This signal, however, is not used for the imaging operation. In the description that follows, this read operation is referred to as the reset process.

First, the light-emitting unit 111-x-1 on the first row emits light. At the same time, the charge signal is accumulated in the detection element 113-x-2 on the second row, which charge signal is read. In FIG. 12, the time 150 and 151, for example, occur at the same time, so that the light radiated during the time 150 is detected and read out during the time 151. In the process, the detection element 113-x-2 is not entered by the direct light from the light-emitting units 111, and can detect part of the light 130-1 reflected on the surface of the object 129 or the light light 130-2 scattered in the object 129 shown in FIG. 11.

Next, the light radiation and the signal read operation are suspended, and the light is emitted from the light-emitting unit 111-x-2, while the signal is read by the detection element 113-x-3. Further, this process is switched N times sequentially. Then, the signals on N rows can be read and an image of the object 129 obtained.

According to this embodiment, as compared with the second embodiment, a collimator having a wide opening can be used and easily realized. Also, the distance between the light-emitting units 111 and the detection elements 113 from each other facilitates the detection of the light scattered in the object 129 more than the light reflected on the surface of the object 129. This embodiment is suitable, therefore, for the imaging device using the light scattered in the object 129 like in the vein authentication.

According to this embodiment, the light-emitting unit 111 for emitting the light and the detection element 113 for reading the signal are shifted from each other in the direction along the rows, but the invention is not limited to this configuration. As an alternative, the light-emitting unit 111 and the detection element 113 may be shifted in the direction along the columns or in the directions along both the rows and the columns. According to this embodiment, they are shifted only one row but can be shifted more. Especially in the case where the light-emitting unit 111 for emitting the light and the detection element 113 for reading the signal are shifted from each other to a large measure, the solid angle of the light-emitting unit 111 to the detection element 113 becomes substantially zero, so that the direct light ceases to enter without the collimator layer 136. In the process, the very control method of separating the light-emitting unit 111 for emitting the light and the detection element 113 for the signal read operation from each other can make up a light-blocking means.

Although the collimator layer 136 is used as a light-blocking means in this embodiment, the invention is not limited to this configuration, but the structure employing the light-blocking layer described in the first embodiment is also applicable.

Further, in place of the collimator layer 136, a transparent layer having an anisotropic transmittance may be used. The fiber optical plate, the line control film, the liquid crystal or an organic material having the anisotropic crystal structure may be an example.

Also, in place of the collimator layer 136, a transparent layer having a predetermined absorption factor such as a neutral density (ND) filter may be employed. In such a case, the light entering the transparent layer at right angles from the object is also absorbed. The direct light entering diagonally or the scattered light, however, has a longer light path through the transparent layer and larger in absorption rate. To absorb the diagonally entering light efficiently, a transparent layer having a comparatively large thickness of not less than several 100 μm is desirable.

Also, in place of the collimator layer 136, a reflection layer for reflecting the diagonally incident light may be used. This structure includes first and second layers of different refractive indexes, wherein the first layer smaller in refractive index is arranged on the light incident side. In this case, that part of the light entering the second layer large in refractive index which has an incidence angle not less than a predetermined angle from the normal to the surface is reflected.

According to this embodiment, every pixel 110 has a light-emitting unit 111. The invention, however, is not limited to this structure, but the light-emitting unit may be arranged for each row or every several rows. Also, a similar arrangement may of course be made along the columns. Further, the light-emitting units 111 may be arranged variously. For example, they may be interspersed, concentrated at a given position or arranged only for the pixels 110 in the vicinity of the pixel array.

Fourth Embodiment

Figure 13:
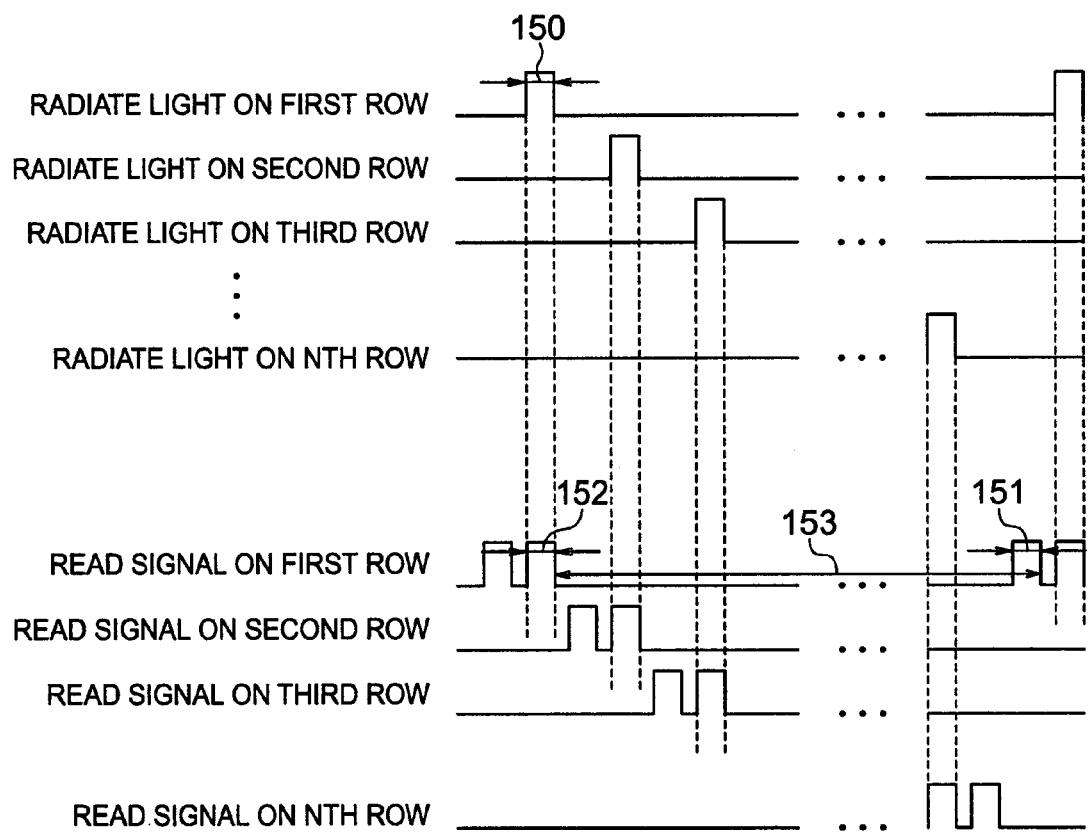
FIG. 13 is a diagram for explaining the timing of radiating the light and reading the signal of the imaging device according to a fourth embodiment.

The imaging device according to this embodiment has a different signal reading method from the third embodiment. The control method is explained with reference to FIG. 13. As shown in FIG. 3, although the control timing of the light radiation is similar to that of the third embodiment, the control timing of the read operation is different from that of the third embodiment. The control operation according to this embodiment includes the signal read operation for producing an image and the reset process. In the read control operation for the first row, for example, the signal read operation during the same time 152 as the light radiation time 150 for the same pixel 110 is the reset process. The signal obtained by the read operation during the time 151, on the other hand, is the signal accumulated during the time 153 and used for imaging. Specifically, the signal for the first row excludes the time of radiation by the light source unit 111 of the same row entered by the direct light, and constitutes the integration of the signals due to the light radiated by the second to Nth rows. This is also the case with the other rows which are similarly controlled and obtain an integrated value of the signal due to the light radiated by other than the related row. By this control operation, as compared with the third embodiment, the entrance of the direct light is suppressed, and the light radiation time can be increased without changing the reading time.

The light emission and the signal read operation, though performed in the direction along the rows according to this embodiment, can of course be performed in the directions along both columns and rows. Various other methods are conceivable. For example, the imaging operation of the fourth embodiment is first performed along the rows of only the odd-numbered columns, and then along the rows of the even-numbered columns thereby to produce an image.

According to this embodiment, the imaging signal is not acquired only as long as the light is radiated by the related pixel. This invention, however, is not limited to this configuration, and the signal need not be read while the light is emitted from plural light-emitting units 111 including the related pixel. Also, unlike in the foregoing embodiments in which the reset process is executed for the entire light radiation period without the signal read operation, the invention is not limited to this configuration, and the reset process may be executed only during the signal read operation after the last radiation.

Fifth Embodiment

The imaging device according to this embodiment is different from the first embodiment in that the imaging device according to this embodiment includes display light-emitting units. An example of the imaging device 101 according to this embodiment is explained with reference to the tomogram of FIG. 14.

Figure 14:
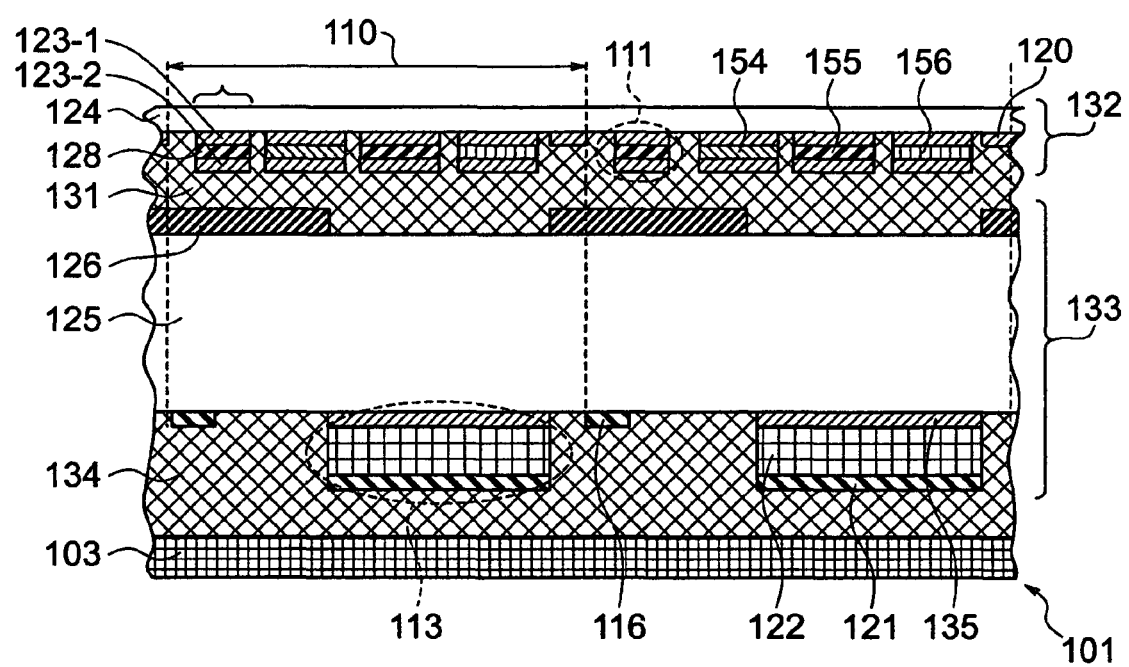
FIG. 14 is a sectional view of the imaging device according to a fifth embodiment.

FIG. 14 is a tomogram taken at the first position 107 in FIG. 1. The imaging device 101 according to this embodiment includes a light-emitting unit layer 132 having, for each pixel 110, display red light-emitting units 154 for emitting the light of the red wavelength, display red light-emitting units 155 for emitting the light of the green wavelength and display red light-emitting units 156 for emitting the light of the blue wavelength. These display light-emitting units are transparent to the light radiated from the light source units 111 and each have a structure in which an organic EL material is held by, for example, transparent electrodes. The organic EL material for emitting the red light includes Rubrene, DCM, BPPC, etc. as a monomeric light-emitting material, and PAT, etc. as a high-polymer light-emitting material. Also, the organic EL material for emitting green includes Bebq2, Alq3, Tb(arac)3, etc. as a monomeric light-emitting material and PDPA, PPV, etc. as a high-polymer light-emitting material. Further, the organic EL material for emitting the blue light includes DPVBi, PESB, EM2, Spiro-TAD, Zn(BOX)2, etc. as a monomeric light-emitting material, and PDAF, PAPA, etc. as a high-polymer light-emitting material. Further, organic EL light-emitting materials of various structures are available as high-polymer light-emitting materials, and may include an organic EL material containing a phosphorescent material. Nevertheless, the materials shown above are only some examples, to which the invention is not limited.

The display light-emitting units 154, 155, 156 each include a light-emitting unit switch, and by operating this switch, each color light is emitted. Further, like the light source units 111, the display light-emitting units 154, 155, 156 are connected to the light-emitting unit current control circuit 102 and the light-emitting unit shift register 118. This configuration, however, is only one example of this embodiment, and the light-emitting unit current control circuit and the light-emitting unit shift register may be arranged exclusively for the display light-emitting units. This configuration makes it possible to sequentially switch and display the pixels 110 and the colors.

The detection elements 113, if formed of amorphous silicon as in this embodiment, are generally sensitive to the light radiated from the display light-emitting units 154, 155, 156. Before the imaging operation, therefore, the display function is required to be stopped. In the case where the image is kept on display, the time to stop the light emission from the display light-emitting units 154, 155, 156 is required to be inserted between display sessions, during which time the imaging operation is performed.

Further, in the case where the display light-emitting units 154, 155, 156 have the sensitivity, the detection elements 113 can be used for various applications other than the imaging. An example is an external light sensor for adjusting the display intensity in accordance with the intensity of the external light. Another example is a touch panel sensor for reading the approach of a finger or the like according to the reflection of the display light. Other examples of possible application include a power regulation sensor for measuring the light emission amount of the display light-emitting units 154, 155, 156 and changing the wattage supplied from the light-emitting unit current control circuit in accordance with the change in the light emission amount, and a monitoring sensor for measuring the light emission amount and detecting the malfunction of the display light-emitting units 154, 155, 156. Further, the detection elements 113 can be used as a sensor for measuring the accuracy of the bonding position between the light source unit layer 132 and the detection elements 133 at the time of fabrication.

As described above, the imaging device 101 having the configuration according to this embodiment can be implemented as a light source-equipped imaging device with the display function.

The light-blocking layer according to this embodiment desirably reflects at least part of the light from the display light-emitting units 154, 155, 156. This structure increases the display light amount output and improves the display image quality.

The display light-emitting units according to this embodiment are configured of three colors. This invention is not confined to this configuration, and the display light-emitting unit may alternatively be formed of any single or plural colors with equal effect. Also, the display light-emitting units described above each have a single layer for each color and are arranged in juxtaposition. The invention, however, is not limited to this configuration, and the display light-emitting units 154, 155, 156 may have a laminated structure. Also, the display light-emitting unit according to this embodiment may have a structure of color conversion type including a color conversion layer, so that the light-emitting element 128 may emit the blue light, which is changed in wavelength by the color conversion layer and radiated on the object. Further, the display light-emitting units according to this embodiment may be of color filter type including a color filter, in which the light-emitting element 128 emits the white light, and transmitting only the light of the required wavelength through the color filter, be radiate it on the object.

According to this embodiment, the light source unit layer 132 is so structured that the light source units 111 each include the light-emitting element 128 held by the electrodes. This, however, is only an example of the embodiment, and the invention is not limited to this embodiment. Instead, the light source unit layer 132 may alternatively be so structured that one or both of a current transport layer and a hall transport layer are interposed between the electrodes and the light-emitting element 128.

In the light source unit layer 132 according to the embodiment described above, the display light-emitting units are formed of the organic EL material. This structure, however, is only an example of the embodiment, and the display light-emitting units may be formed of another material.

As a circuit configuration according to this embodiment, the circuit configuration of active type was described above in which each display light-emitting unit has a light-emitting unit switch. Nevertheless, the invention is not limited to this configuration, and the circuit configuration of passive or other type may be employed with equal effect.

The display light-emitting units according to this embodiment correspond to the light source units 111, respectively. The invention, however, is not limited to this configuration, and the light source units 111 or the display light-emitting units may be arranged more densely than the other. Also, the light source units 111 and the display light-emitting units may coexist, no display light-emitting unit or no light source unit 111 may exist at a given position of the imaging device 101.

Sixth Embodiment

Figure 15:
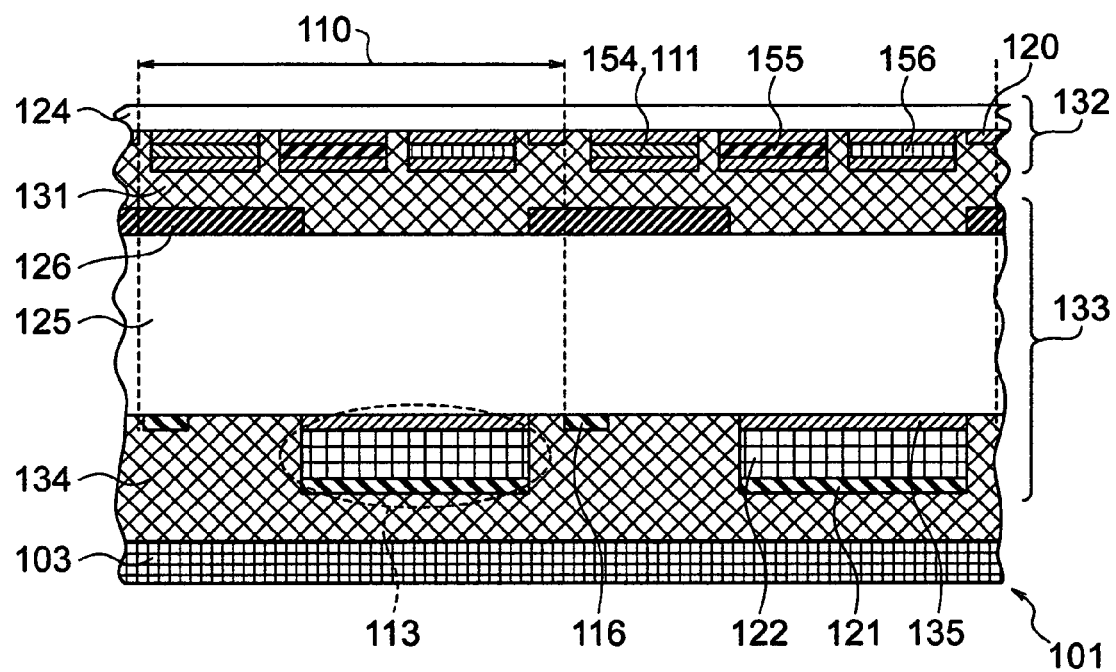
FIG. 15 is a sectional view of the imaging device according to a sixth embodiment.

The imaging device according to this embodiment, as shown in the tomogram of FIG. 15, is different from the fifth embodiment in that the imaging device according to this embodiment lacks the light-emitting units 111 in the light-emitting unit layer 132 and the display red light-emitting units 154 double as the light-emitting unit layer 132. Specifically, the imaging operation is performed using the light from the display red light-emitting units 154. This structure can increase the size of the display light-emitting units, and therefore, the display light intensity is improved for a higher display image quality.

According to this embodiment, the display red light-emitting units 154 double as the light source units 111. Nevertheless, the display green light-emitting elements 155 or the display blue light-emitting elements 156 may of course double as the light source units 111. Further, plural instead of one type of display light-emitting unit may of course be used in place of the light source units 111.

According to this embodiment, the display light-emitting units doubling as the light source units 111 may radiate the light of the same spectrum or a different spectrum for imaging and display. As a method of radiating the light of a different spectrum, the polarity of the voltage applied to the organic EL element, for example, is changed. An example of the organic EL element having this characteristic is the PPV light-emitting liquid crystal polymer. Another method consists in changing the spectrum by changing the magnitude of the voltage applied to the organic EL element. An example of the material having this characteristic is a Me-LPPP/MEH-PPV light-emitting composition.

Seventh Embodiment

Figure 16:
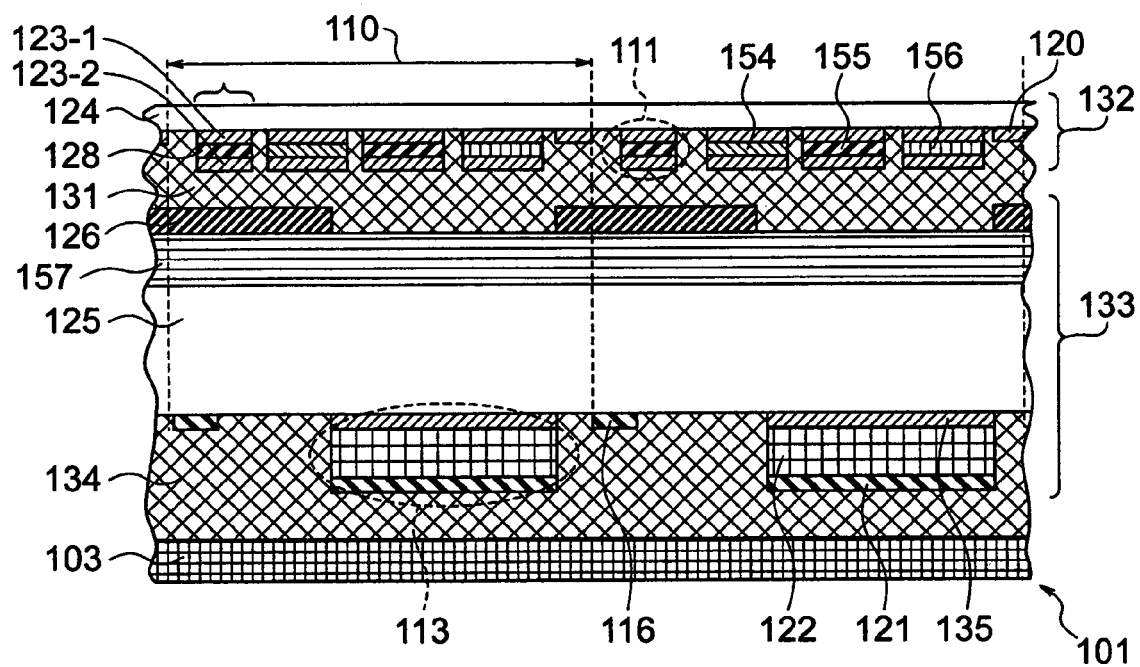
FIG. 16 is a sectional view of the imaging device according to a seventh embodiment.

The imaging device according to this embodiment, as shown in the tomogram of FIG. 16, is different from the fifth embodiment in that the imaging device according to this embodiment includes an optical filter 157. The optical filter 157 selectively transmits, out of the light from the light source units 111, only the light of a wavelength required for the imaging operation. In this structure, only the light required for the imaging operation can be led to the detection elements 113. The light of the remaining wavelength can be shut off, and therefore, the contrast resolution is improved.

Figure 17:
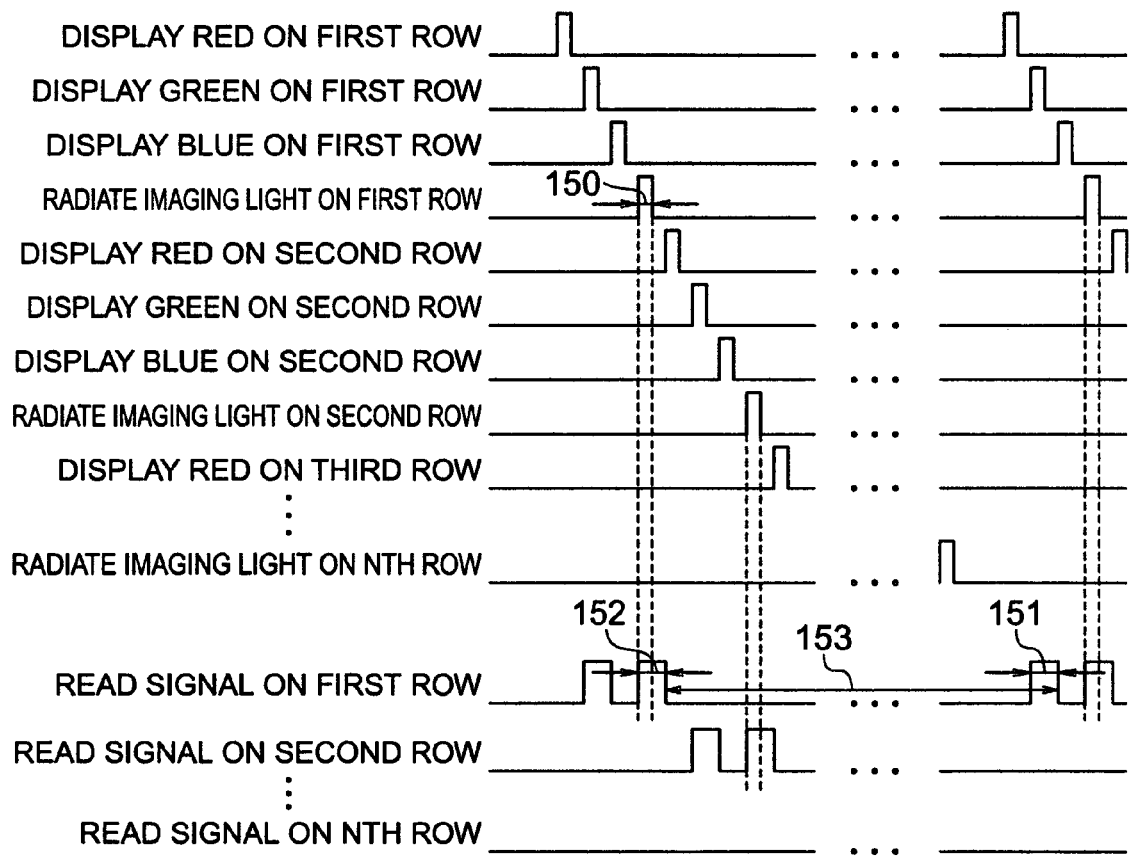
FIG. 17 is a diagram for explaining the method and timing of radiating the light and reading the signal of the imaging device according to the seventh embodiment.

An example of the reading method and timing in the imaging device 101 having the configuration according to this embodiment is explained with reference to FIG. 17. In this method, the first step is to cause the display light-emitting units 154, 155, 156 on the same row to emit light sequentially, after which the light source units 111 on the same row emit light. During the light radiation from the light source units 111, the reset process is executed for the detection elements 113 on the same row. In FIG. 12, the reset process is executed during time 152, i.e. during the light emission time 150 of the light source units 111 on the same row. Also, in FIG. 12, the time 152 continues after the time 150. This is in order to execute the reset process also during the after-image period which is estimated for the light source units 111.

After the reset process, the detection elements 13 on the first row accumulate the charge generated till the time 151 when the signal is read next. In the meantime, like on the first row, the display light-emitting units 154, 155, 156 and the light source units 111 radiate the light on different rows sequentially. In the process, part of the light radiated from the light source units 111 is reflected or scattered by the object 129 and reaches the detection elements 113 on the first row. The light radiated from the display light-emitting units 154, 155, 156, however, is blocked by the optical filter 157 and fails to reach the detection elements 113. In the detection elements 113 on the first row, therefore, the signal generated by the light radiated from the light source units 111 on the 2nd to Nth rows can be acquired during time 151. In similar fashion, the detection elements 113 on the other rows can acquire the signal, so that the image of the object 129 can be obtained from the signals of all the detection elements 113.

With the configuration and the reading method of the imaging device 101 described above, the image of the object 129 can be obtained by conducting the display and the imaging operation concurrently. Also, this embodiment is desirably so configured that the optical filter 157 is a bandpass filter and the imaging operation is conducted with substantially monochromatic light. In such a case, the signal generation by the light of the unrequired wavelength can be suppressed, and therefore, the contrast resolution is improved.

In the imaging device 101 according to this embodiment, the optical filter 157 preferably reflects the light of the wavelengths of the display light-emitting units 154, 155, 156. In this case, the display light intensity can be improved. Such an optical filter may be a cold mirror as long as the near infrared light is used for imaging. This cold mirror can be implemented using, for example, a dielectric multilayer film. In similar fashion, the light-blocking layer 126 reflects the light having the wavelength of the display light-emitting units 154, 155, 156.

Eighth Embodiment

Figure 18:
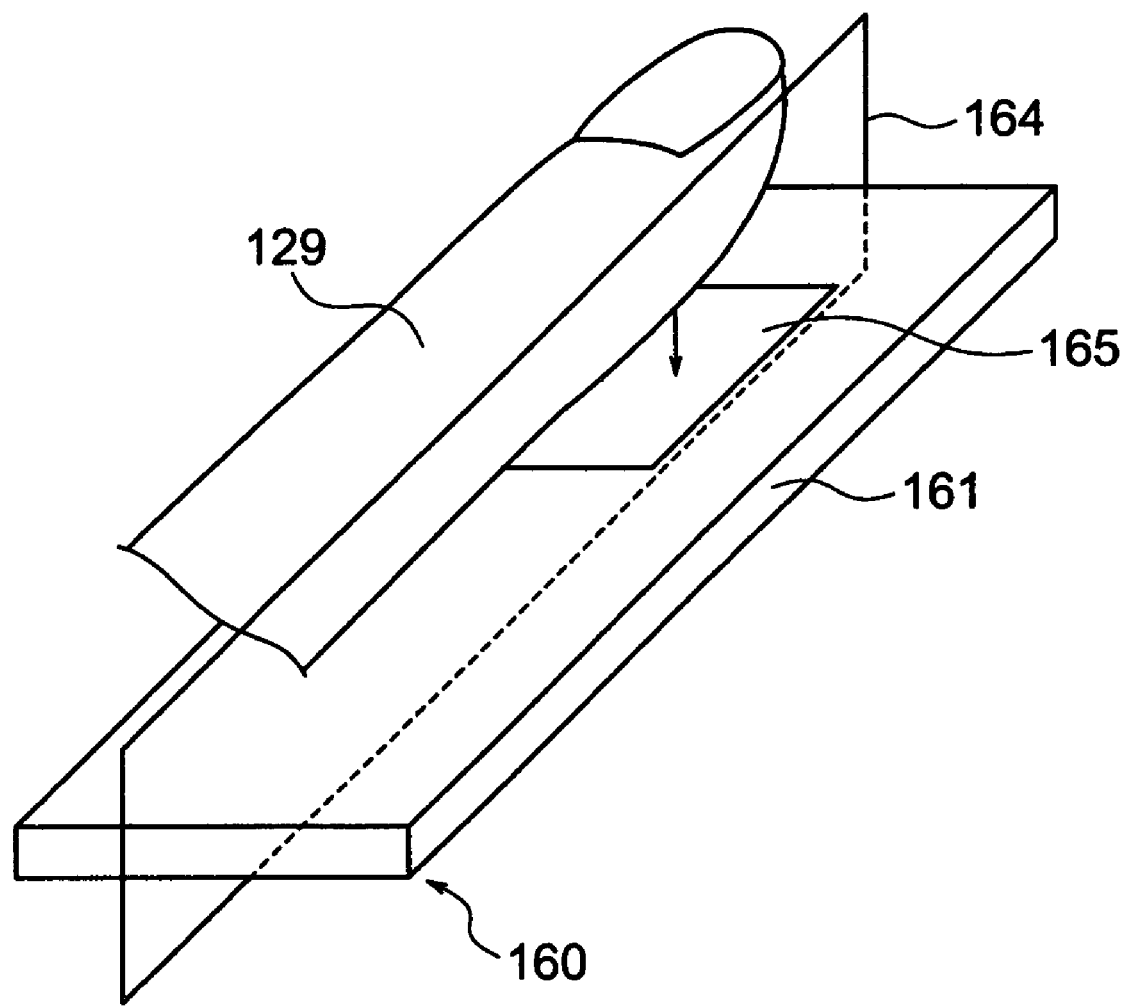
FIG. 18 is a diagram showing a general configuration of an example of the finger vein authentication apparatus according to an eighth embodiment.
Figure 19:
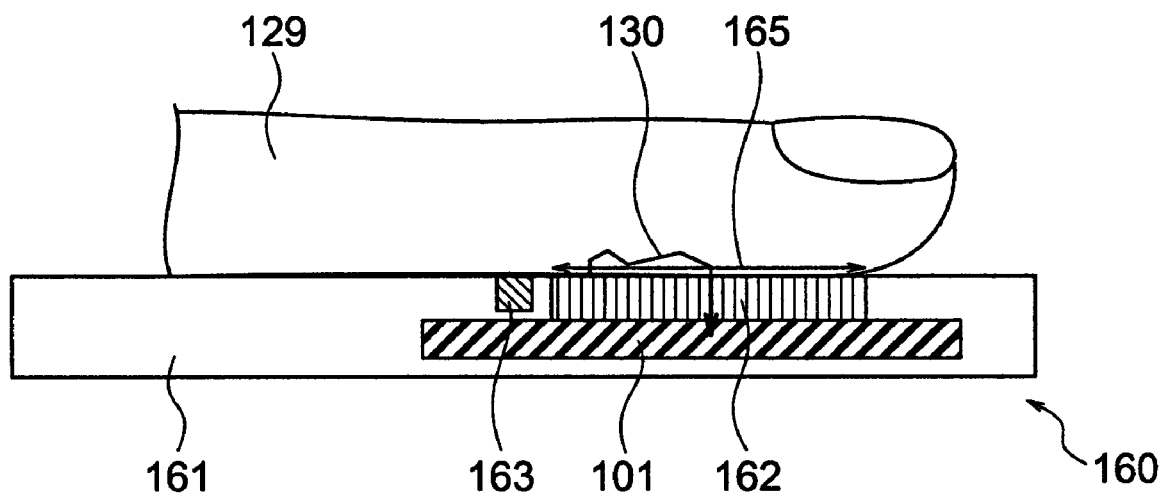
FIG. 19 is a sectional view of the finger vein authentication apparatus according to the eighth embodiment.
Figure 20:
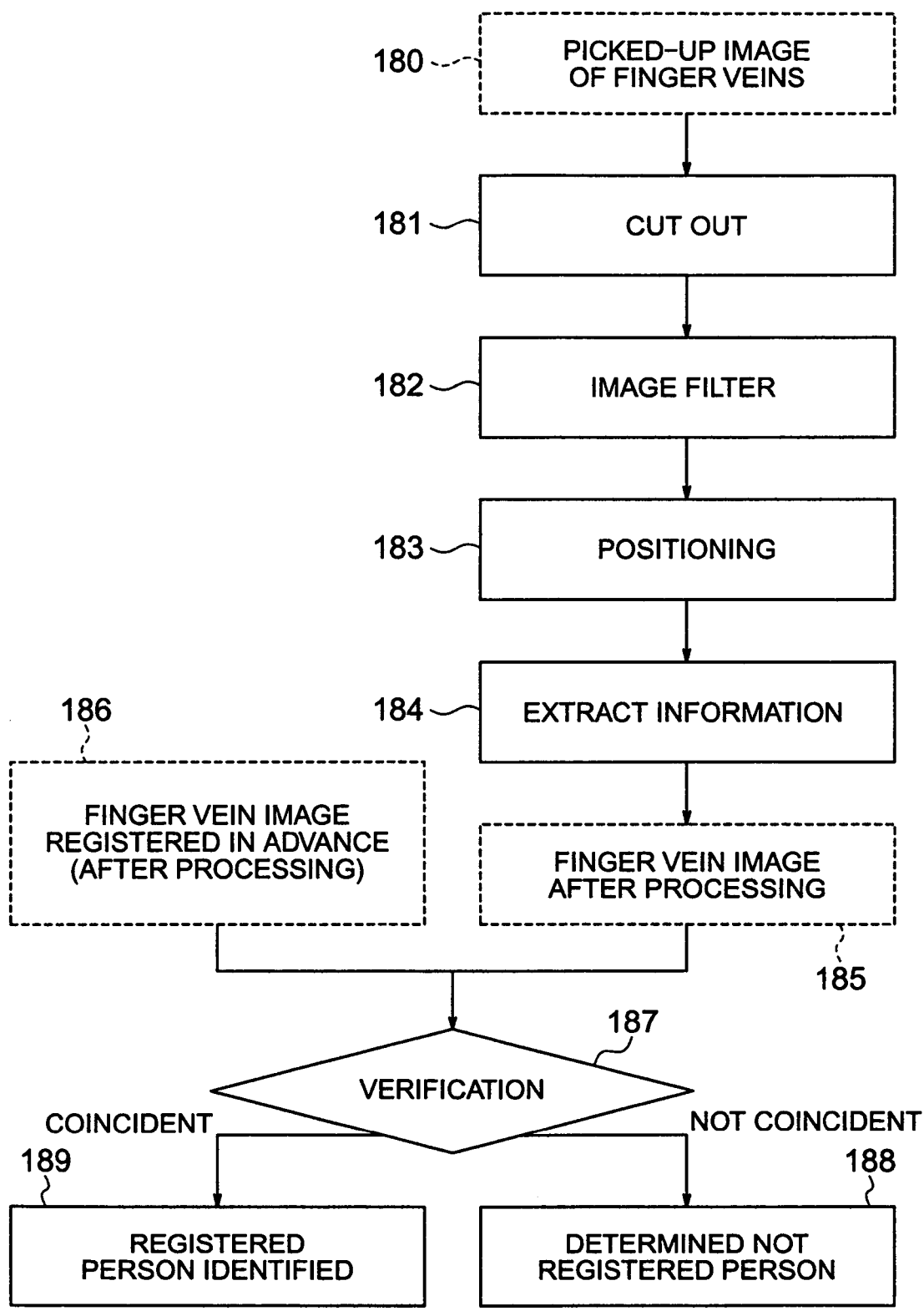
FIG. 20 is a diagram for explaining the flow of the process for the finger vein authentication apparatus according to the eighth embodiment.

This embodiment represents a finger vein authentication apparatus having mounted thereon the imaging device according to the first to fourth embodiments. FIG. 18 is a diagram for explaining the general configuration of an example of the finger vein authentication apparatus. FIG. 19 is a sectional view taken at the position 164 in FIG. 18. FIG. 20 is a diagram for explaining the flow of the process executed for personal authentication.

The finger vein authentication apparatus 160 is for identifying an individual person using the image of the finger veins. This image is picked up, as shown in FIG. 18, by placing the finger 129 over the imaging window 165 of the finger vein authentication apparatus arranged on an apparatus package 161. The imaging window 165 is of such a size as to be covered by the finger which blocks the external light entering the imaging device 101 at the imaging time.

The apparatus configuration and the imaging method are explained with reference to the sectional view of FIG. 19. The finger 129, when placed on the imaging window 165 of the finger vein authentication apparatus 160, comes into contact with an imaging start switch 163 and the light begins to be radiated on the finger from the light source units 111 in the imaging device 101. This light is preferably the near infrared light having the wavelength of 600 nm to 1200 nm easy to enter the finger. Examples of the organic EL elements for emitting the light of this wavelength include the luminescent materials of PVK (polyvinylcarbazol) doped with ionic emissive dyes, the luminescent materials of Alq3 (aluminum tris (8-hydroxyquinolinate)) doped with reduced porphyrin, the luminescent materials of Alq3 (aluminum tris(8-hydroxyquinolinate)) doped with pyran compound, the near infrared phosphorescent lanthanide complexes and the red luminescent materials of dystyryl compounds. Nevertheless, these materials are only some examples, to which the invention is not limited.

The light radiated into the finger 163 is absorbed and scattered inside the finger and part thereof is output form the surface of the finger. In the process, the absorption of the deoxidized hemoglobin in the vein blood is different from that for the other tissues or blood. By imaging this light with the imaging device 101, therefore, the required image can be obtained. The collimator 162 removes the incident direct light and the scattered light incident at other than the angle substantially perpendicular to the detector. Also, the collimator prevents the imaging light from being scattered before reaching the finger 129. The light path 130 shown in FIG. 19 is an example of this light trajectory.

Next, the image thus obtained is subjected to the imaging process for the finger vein authentication. An example of this process is explained with reference to FIG. 20. First, the process 181 is executed for cutting out the finger vein image 180 picked up, and by extracting the contour, only the finger portion is cut out. Next, this image is subjected to the filter process 182 thereby to prepare an image of the spatial frequency component required for the finger veins. This filter process 182 is executed using a high-pass filter, for example, and followed by the positioning process 183 to correct the angular difference of the finger. The resulting image is subjected to the information extraction process 184 thereby to obtain only the finger vein image 185 used for personal authentication. In this process, only the finger veins used for personal authentication are extracted based on the size and density of the finger veins in the image obtained by the imaging operation.

In conducting the personal authentication using the image obtained in this way, the verification step 187 is executed to ascertain whether the particular image is coincident with the finger vein image 186 registered in advance. This finger vein image 186 registered in advance is also subjected to the image processing in the same manner as described above. Depending on the apparatus used, a plurality of finger vein images 186 may be registered in advance. The verification step 187 determines whether the images are coincident with each other or not based on the cross-correlation, for example. In the presence of identical images as the result of the determination, the step 189 for identifying the registered person is completed, or otherwise, step 188 determines that no coincident person is registered. In the case where the PC is used as the finger vein authentication apparatus, for example, the result of determination is sent to the PC as a signal to validate the PC only upon successful identification of the registered person. In the case where this finger vein authentication apparatus is used for the ATM, on the other hand, the signal required to permit the cash withdrawal is transmitted to the ATM only in the case where the registered person is successfully identified.

The finger vein authentication apparatus according to this embodiment with the imaging device of the fifth to seventh embodiments mounted thereon can of course be implemented with the display function. Further, the general configuration, the structure and the processing method of the finger vein authentication apparatus described in this embodiment are only an example, to which the invention is not limited. Also, this embodiment represents the application of the apparatus for authentication using the finger veins, to which the invention is not limited. As an alternative, the invention is applicable also to an authentication apparatus using the veins of the palm or the back of the hand. Further, the apparatus according to this embodiment is not necessarily the finger vein authentication apparatus but may be implemented as a fingerprint authentication apparatus used for fingerprint authentication, or as an apparatus for authentication using both the finger veins and the fingerprint.

Ninth Embodiment

Figure 21:
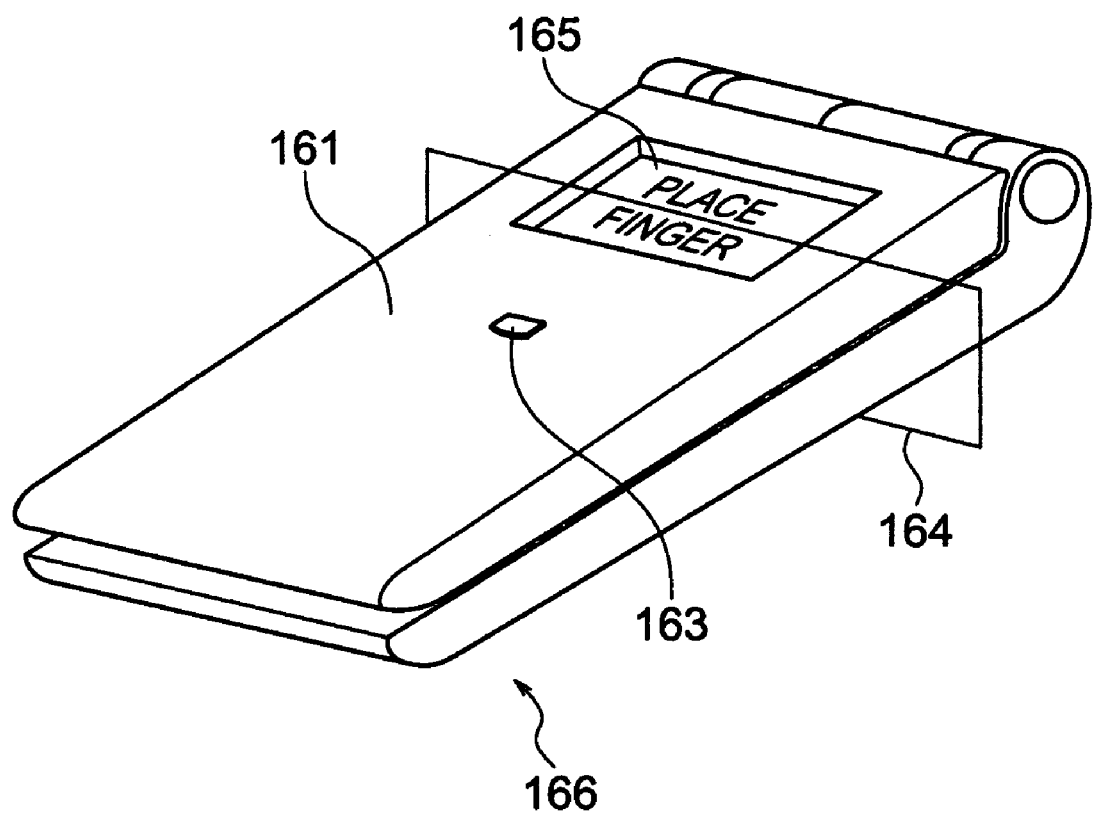
FIG. 21 is a diagram showing a general configuration of an example of the mobile phone according to a ninth embodiment.

This embodiment represents a mobile phone with the finger vein authentication function which carries the imaging device described in the fifth to seventh embodiments. FIG. 21 is a diagram for explaining the general configuration of an example of the mobile phone, and FIG. 22 is a sectional view of the mobile phone according to this embodiment.

The mobile phone 166 according to an example of this embodiment shown in FIG. 21 has the function of identifying an individual person using the image of the finger veins. For the imaging operation, the finger is placed on the mobile phone 160 in response to a subdisplay instruction and an imaging start switch 163 is depressed. Then, the imaging operation is started. The light source wavelength and the material of the light-emitting elements used in this process for imaging the finger veins are similar to those of the eighth embodiment described above. Also, the image obtained is processed similarly to the method described in, for example, the eighth embodiment.

Figure 22:
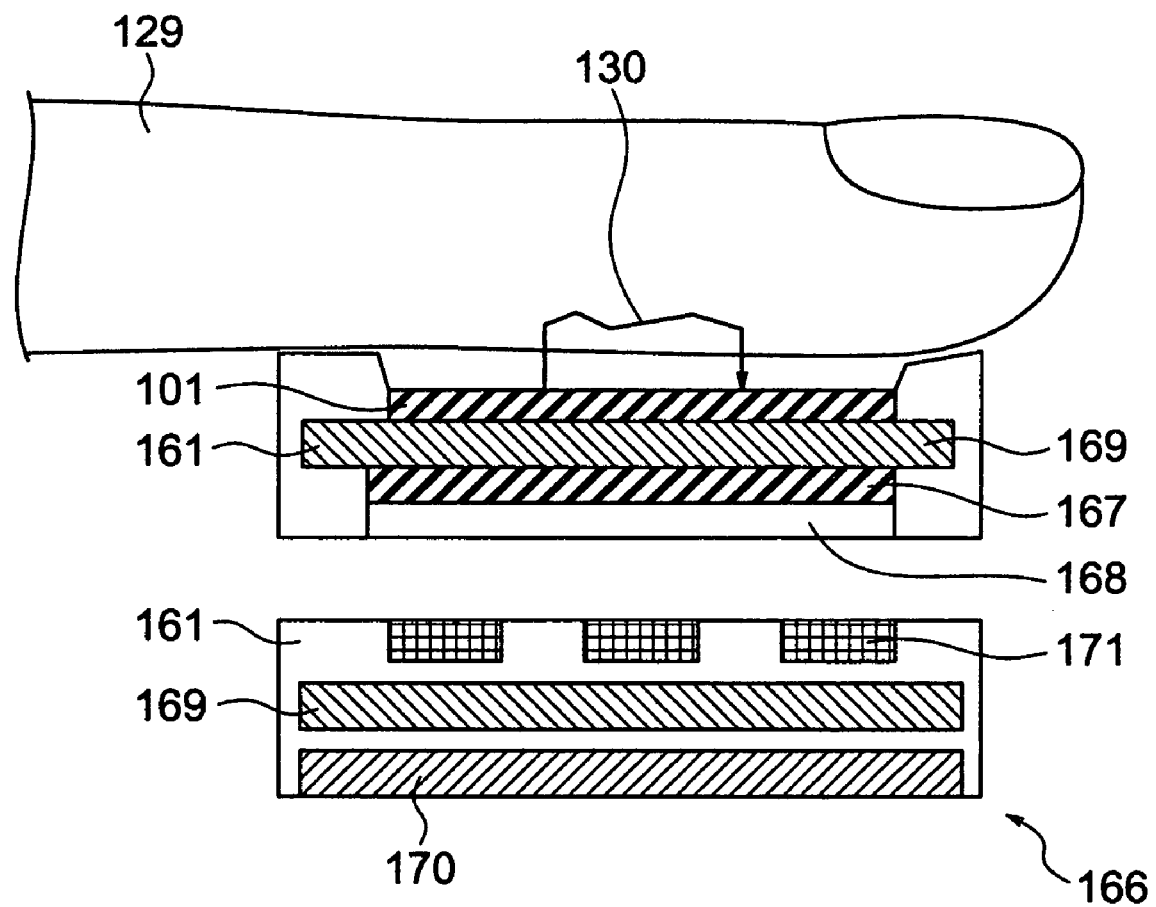
FIG. 22 is a sectional view of the mobile phone according to the ninth embodiment.

FIG. 22 is a sectional view taken at position 164 in FIG. 21. The mobile phone 166 according to this embodiment includes an upper part having a subdisplay on the upper surface thereof, a main display on the lower surface thereof and a processing circuit 169 between the upper and lower surfaces on the one hand, and a lower part having push buttons 171, a processing circuit 169 and a battery 170. The main display in the upper part has mounted thereon a main display imaging device, while the subdisplay has mounted thereon the imaging device 101 described in the fifth to seventh embodiments. This imaging device 101 can be implemented with both the display and the finger vein imaging operation. Therefore, the mobile phone 166 can exhibit the function of authenticating the finger veins without adversely affecting the compactness and the general appearance. Also, the availability of the display function and the capability of displaying an imaging guide can realize the operating convenience for the user.

This embodiment represents a case in which the subdisplay includes the imaging device 101. Nevertheless, the main display may of course be used with the imaging device 101.

The general configuration, structure and the processing method of the mobile phone with the finger vein authentication function according to this embodiment are only an example, to which the invention is not limited. Also, the mobile phone according to this embodiment is equipped with the authentication apparatus using the finger veins. The invention, however, is not confined to this example and applicable to the authentication apparatus using the veins of the palm or the back of the hand with equal effect. Further, in place of the finger vein authentication function, the fingerprint may be used for authentication, or a plurality of factors including the finger vein and the fingerprint may be authenticated.

Tenth Embodiment

This invention is not limited to the finger vein authentication apparatus or the mobile phone having the finger vein authentication function, but is applicable also to the apparatus with the detection unit of the first to seventh embodiments mounted on the image reader such as the scanner or the facsimile. Further, the invention is applicable to various imaging devices in which the object is imaged using the visible light or the near infrared light as a light source.

Further, this invention is not limited to the embodiments described above, and can be embodied as various modifications without departing from the spirit of the invention. Furthermore, the embodiments described above include various stages, and by appropriately combining plural component elements disclosed, various forms of the invention can be extracted. For example, several component elements may be deleted from all the component elements described in the embodiments.

In addition to the foregoing description of embodiments, the following is disclosed.

20. The imaging device with the display function according to Claim 19, wherein the display light source units are each configured of two or more light source units having different spectra.

21. The imaging device according to Claim 19, wherein the imaging light source units and/or the display light source units each include an organic EL layer.

22. The imaging device according to Claim 21, wherein the imaging light source units include at least one of a color conversion layer and a color filter.

23. The imaging device with the display function according to Claim 19, wherein an optical filter transparent to the imaging light and opaque to at least part of the visible light is arranged between the display light source units and the detection elements.

24. The imaging device with the display function according to Claim 23, wherein the optical filter includes a reflection filter for reflecting at least part of the visible light.

25. The imaging device according to Claim 23, wherein the detection layer includes, for each detection element, a means for accumulating the electrical signal of the detection element and a means for switching the output of the accumulation signal, the imaging device further comprising a light source control means for controlling the light radiation from the imaging light source units and the display light source units, and a means for controlling the accumulation time of the detection element signal and reading the pixel accumulation signal, and wherein the light source control means radiates the light from the imaging light source units and the display light source units during the accumulation time.

26. The imaging device with the display function according to Claim 19, further comprising a shared light source unit doubling with at least a part of the display light source units and at least a part of the imaging light source units.

27. The imaging device with the display function according to Claim 26, wherein the shared light source unit has different spectra for the imaging operation and the display operation.

28. The imaging device with the display function according to Claim 27, further comprising a shared light source control means for controlling the power supplied to the shared light source unit, wherein the light source control means changes the light emission spectrum by applying different voltages to the shared light source unit for the display operation and the imaging operation.

29. The imaging device according to Claim 19, wherein the detection elements are sensitive to at least part of the visible light.

30. An authentication apparatus comprising:

a light source-carrying imaging device including a light source layer having a plurality of imaging light source units for radiating the imaging light containing a first wavelength on an object to be imaged, a detection layer having a plurality of detection elements for detecting the light of the first wavelength radiated from the light source units, and a light-blocking means interposed between the light source layer and the detection layer, the light source layer being held between the detection layer and the object to be imaged;

a digital conversion means for generating a digital image of the biological information on the object based on the signal from the light source-carrying imaging device;

a means for storing the biological information on the object in advance; and an authentication means for extracting the information by processing the signal of the digital image generated by the digital conversion means and authenticating an individual person by comparing the extracted information with the biological information stored in the storage means.

31. The authentication apparatus according to Claim 30, wherein the light-blocking means is arranged in such a manner as to block the direct radiation of at least part of the light radiated from the light source units to the detection elements.

32. The authentication apparatus according to Claim 30, wherein the biological information is at least one of the fingerprint, the finger veins, the palm veins and the veins of the back of the hand.

33. A portable terminal comprising:
a light source-carrying imaging device including a plurality of display light source units for emitting the visible light, a light source layer having a plurality of imaging light source units for radiating the imaging light containing a first wavelength on an object to be imaged, a detection layer having a plurality of detection elements for detecting the light of the first wavelength radiated from the light source units, and a light-blocking means interposed between the light source layer and the detection layer, the light source layer being so structured as to be held between the detection layer and the object to be imaged;
a digital conversion means for generating a digital image of the biological information on the object based on the signal from the light source-carrying imaging device;
a means for storing the biological information on the object in advance; and
an authentication means for extracting the information by processing the signal of the digital image generated by the digital conversion means and authenticating an individual person by comparing the extracted information with the biological information stored in the storage means.

34. The portable terminal according to Claim 33, wherein the light-blocking means is arranged in such a manner as to block the direct radiation of at least part of the light radiated from the light source units to the detection elements.

The invention claimed is:

1. An imaging device comprising:
a light source layer having a plurality of imaging light source units for radiating the imaging light containing a first wavelength to an object to be imaged;
a detection layer having a plurality of detection elements for detecting the light of the first wavelength radiated from the light source units; and
a light-blocking means interposed between the light source layer and the detection layer;
wherein the light source layer is held between the detection layer and the object to be imaged,
wherein the light-blocking means is arranged substantially in parallel to the light source layer and the detection layer, an end point of each light source unit along a first direction and located on the surface of the light source unit facing an object to be imaged is assumed to be A, a point where a vector that is perpendicular to the detection layer and passes through the end point A intersects the detection layer is assumed to be 0, a distance between the end point A and point 0 is assumed to be L1, and a distance from an intersection B between the vector and the light-blocking means on a side of the light source layer is assumed to be L2, and the light-blocking means is configured to expand by at least a distance M in the first direction from the intersection B, and
wherein each detection element is positioned at a distance from the intersection 0 in the first direction that is not greater than (L1/L2)M, and at least a part of the detection element is positioned at a distance from the intersection 0 in the first direction that is not less than M.

2. The imaging device according to claim 1, wherein the light-blocking means is arranged in such a manner as to block the direct radiation of at least part of the light radiated from the light source units to the detection elements.

3. The imaging device according to claim 1, wherein a layer of a transparent material transparent to the first wavelength is interposed between the light-blocking means and the detection layer.

4. The imaging device according to claim 1, wherein the surface of the light-blocking means facing the imaging light source unit is larger than the surface of the imaging light source unit facing the light-blocking means.

5. The imaging device according to claim 1, wherein the light-blocking means is a collimator.

6. The imaging device according to claim 5, wherein the collimator includes a light-blocking plate and a transparent plate, and the light-block plate is interposed between the intersection of the detection layer and the normal to the detection layer passing through the end point of the light source element and the detection element.

7. The imaging device according to claim 5, wherein the collimator includes a plurality of light-blocking plates and transparent plates, and the interval of the light-blocking plates is not more than one half of the interval of the detection elements.

8. The imaging device according to claim 6, wherein an end point of a given light source element along the first direction which point is located on the surface of the light source element facing an object to be imaged is assumed to be A, a point where the normal to the detection layer passing through the end point A intersects the detection layer to be 0, the distance between the end point A and the intersection 0 to be L, the distance from the intersection 0 to the nearest light-blocking plate in the first direction to be w, the thickness of the light-blocking plate to be d, and the height of the light-blocking plate to be h, and
wherein the detection element is arranged at the distance not less than (w+d) but not more than (w+d)L/(L−h) from the intersection 0 in the first direction.

9. The imaging device according to claim 1, wherein the detection layer includes a means for accumulating the electrical signal of the detection elements and a means for switching the output of the accumulation signal;
the imaging device further comprising a means for controlling the accumulation time of the detection element signal and reading the pixel accumulation signal and a means for controlling the light radiation of the imaging light source units;
wherein the imaging light source control means performs the control operation in such a manner that the imaging light source units at less than a predetermined distance from the first detection element emit no light and at least one of the imaging light source units at not less than the predetermined distance emits light during the accumulation time of the first detection element constituting one of the plurality of the detection elements.

10. The imaging device according to claim 9, wherein the predetermined distance is the distance to the second nearest imaging light source unit from the first detection element.

11. The imaging device according to claim 9,
wherein the imaging light source control means sequentially switches the imaging light source units for radiating the light, and radiates the imaging light plural times from the first imaging light source unit constituting one of the plurality of the imaging light source units, and
wherein the reading means performs the control operation in such a manner that the detection elements for accumulating the signal and reading the signal are sequentially switched, the accumulation time of the detection elements at less than a predetermined distance from the first imaging light source unit is part or the whole of the time between the extinction and the next turning on of the first imaging light source unit, and the accumulation time includes the time during which the light is radiated by at least one of other than the first imaging light source units.

12. The imaging device according to claim 9,
wherein a transmission layer having an anisotropic transmittance is interposed between the light source layer and the detection layer.

13. The imaging device according to claim 12,
wherein the transmission layer has a laminated structure of first and second media, the second medium is held between the first medium and the detection layer, and the refractive index of the second medium is smaller than that of the first medium.

14. The imaging device with the display function according to claim 1,
wherein the detection layer has a dead zone insensitive to the light of the first wavelength, and the dead zone and the imaging light source units are in opposed relation to each other.

15. The imaging device according to claim 1,
wherein the first wavelength is in the range of 600 nm to 1200 nm inclusive.

16. The imaging device according to claim 1,
wherein the imaging light source units include an organic EL layer.

17. The imaging device with the display function according to claim 1,
wherein the light source layer includes display light source units for emitting the visible light, and the display light source units are arranged in opposed relation to the detection elements.

* * * * *